United States Patent
Murata

(10) Patent No.: US 8,558,942 B2
(45) Date of Patent: Oct. 15, 2013

(54) FOCUSING MEASUREMENT DEVICE, FOCUSING MEASUREMENT METHOD, AND PROGRAM

(75) Inventor: Tsukasa Murata, Yamato (JP)

(73) Assignee: Nikon Corporation, Tokyo (JP)

( * ) Notice: Subject to any disclaimer, the term of this patent is extended or adjusted under 35 U.S.C. 154(b) by 651 days.

(21) Appl. No.: 12/669,934

(22) PCT Filed: Aug. 25, 2008

(86) PCT No.: PCT/JP2008/002298
§ 371 (c)(1),
(2), (4) Date: Jan. 20, 2010

(87) PCT Pub. No.: WO2009/050841
PCT Pub. Date: Apr. 23, 2009

(65) Prior Publication Data
US 2010/0182495 A1     Jul. 22, 2010

(30) Foreign Application Priority Data
Oct. 17, 2007  (JP) ................................. 2007-270196
Oct. 17, 2007  (JP) ................................. 2007-270197

(51) Int. Cl.
*H04N 5/228* (2006.01)
*H04N 5/232* (2006.01)

(52) U.S. Cl.
USPC .................................... 348/349; 348/208.99

(58) Field of Classification Search
USPC .................... 348/345, 349, 208.99
See application file for complete search history.

(56) References Cited

U.S. PATENT DOCUMENTS

| | | | | |
|---|---|---|---|---|
| 6,501,503 B2 * | 12/2002 | Kudo | ....................... | 348/208.99 |
| 6,654,061 B2 * | 11/2003 | Yamada | ....................... | 348/355 |
| 7,443,590 B2 * | 10/2008 | Kondo et al. | ................. | 359/618 |
| 7,505,075 B2 * | 3/2009 | Watanabe | ..................... | 348/354 |
| 7,916,208 B2 * | 3/2011 | Kanehiro | ..................... | 348/354 |
| 2003/0174230 A1 * | 9/2003 | Ide et al. | ........................ | 348/345 |
| 2007/0127119 A1 * | 6/2007 | Kondo et al. | ................. | 359/435 |
| 2008/0043135 A1 * | 2/2008 | Sugimoto | ..................... | 348/345 |
| 2008/0131109 A1 * | 6/2008 | Honjo et al. | ................... | 396/123 |
| 2008/0259154 A1 * | 10/2008 | Garrison et al. | ........... | 348/14.01 |

FOREIGN PATENT DOCUMENTS

| | | |
|---|---|---|
| JP | A-05-207352 | 8/1993 |
| JP | A-10-221594 | 8/1998 |
| JP | A-2001-352440 | 12/2001 |

(Continued)

OTHER PUBLICATIONS

International Search Report issued in International Application No. PCT/JP2008/002298 on Sep. 16, 2008 (with translation).

*Primary Examiner* — Aung S Moe
*Assistant Examiner* — Amy Hsu
(74) *Attorney, Agent, or Firm* — Oliff & Berridge, PLC

(57) ABSTRACT

A focusing measurement device according to the present application includes an image input section that obtains a captured image; a filter section that generates, with respect to the image, blurred images by using each pair of filters having different frequency characteristics; an extracting section that extracts, at each of specific points on the image, a first feature quantity and a second feature quantity both from the image and the respective blurred images; and a focusing measurement section that calculates, from the first feature quantity and the second feature quantity, a focusing amount indicating a degree of in-focus to measure a focusing level at each of the specific points on the image.

17 Claims, 18 Drawing Sheets

(56) References Cited

FOREIGN PATENT DOCUMENTS

| JP | A-2006-135523 | 5/2006 |
| JP | B2-3840725 | 11/2006 |
| JP | A-2007-088913 | 4/2007 |
| JP | A-2007-128009 | 5/2007 |
| JP | A-2007-181184 | 7/2007 |
| JP | A-2001-331806 | 11/2007 |
| JP | A-2008-039611 | 2/2008 |

* cited by examiner

FOCUSING MEASUREMENT DEVICE, FOCUSING MEASUREMENT METHOD, AND PROGRAM

CROSS-REFERENCE TO RELATED APPLICATION

This application is a U.S. National Stage application claiming the benefit of prior filed International Application Number PCT/JP2008/002298, filed Aug. 25, 2008, in which the International Application claims a priority date of Oct. 17, 2007, based on prior filed Japanese Application Number 2007-270196 and Japanese Application Number 2007-270197, the entire contents of which are incorporated herein by reference.

TECHNICAL FIELD

The present application relates to a focusing measurement device, a focusing measurement method and a program for evaluating a focusing level indicating a degree of in-focus in performing auto-focus in an imaging device such as an electronic camera and in an image captured by the imaging device.

BACKGROUND ART

Conventionally, a determination whether an in-focus is achieved or not is conducted based on a contrast of an image in an entire image area or in a specific area such as an auto-focus selection area. Specifically, it is determined that the in-focus is achieved as the contrast becomes higher and an out-of-focus occurs as the contrast becomes lower.

According to Patent Document 1, high frequency components in a specific area of an image are extracted and integrated. The document discloses that the integrated value is used as an evaluated value indicating a contrast in the specific area to determine whether an in-focus is achieved or not.

According to Patent Document 2, two high frequency components having different cutoff frequencies in a specific area of an image are respectively extracted. The document discloses that a focusing time taken for focusing on an in-focus position is shortened by appropriately changing a movement speed of an imaging lens of an imaging device in accordance with a displacement width from the in-focus position based on an evaluated value calculated from the two high frequency components.

Patent Document 1: Japanese Patent Publication No. 3840725

Patent Document 2: Japanese Unexamined Patent Application Publication No. Hei 10-221594

DISCLOSURE

Problems to be Solved

However, in the methods such as disclosed in Patent Document 1 and Patent Document 2, there is a chance that, in an image, an evaluated value in an area in which an out-of-focus occurs but a luminance difference is large becomes greater than an evaluated value in an area in which an in-focus is achieved but a luminance difference is small. As a result of this, an error determination such that the in-focus is achieved in the area in which the luminance difference is large is made, although the out-of-focus occurs in the area. Further, in an image captured by an imaging element having a high ISO sensitivity in recent years, a noise of spike shape and the like from pixels of the imaging element is determined as a high frequency component of the image, resulting in that the focusing measurement of the image cannot be conducted accurately.

In view of the aforementioned problems included in the prior art, the present application has a proposition to provide a technique with which a focusing measurement can be accurately conducted also in a measurement of focusing level of an image having a large luminance difference. Further, the present application has another proposition to provide a technique with which a focusing measurement can be accurately conducted also in a measurement of focusing level of an image having a high ISO sensitivity.

Means for Solving the Problems

A focusing measurement device according to a first embodiment includes an image input section that obtains a captured image; a filter section that generates, with respect to the image, blurred images by using each pair of filters having different frequency characteristics; an extracting section that extracts, at each of specific points on the image, a first feature quantity and a second feature quantity both from the image and the respective blurred images; and a focusing measurement section that calculates, from the first feature quantity and the second feature quantity, a focusing amount indicating a degree of in-focus to measure a focusing level at each of the specific points on the image.

A focusing measurement device according to a second embodiment includes an image input section that obtains a captured image; a first filter section that generates, with respect to the image, a first blurred image group by using each pair of filters having different frequency characteristics; a second filter section that generates, with respect to the image, a second blurred image group by using each pair of filters having different frequency characteristics to each other, the frequency characteristics being a low frequency side relative to those of the pair of filters in the first filter section; a first focusing calculating section that calculates, at each of plurality of points on the image, a first focusing amount indicating a degree of in-focus based on a pair of feature quantities each extracted from the image and each of the images of the first blurred image group; a second focusing calculating section that calculates, at each of the plurality of points on the image, a second focusing amount based on a pair of feature quantities each extracted from the image and each of images of the second blurred image group; and a measurement section that measures a focusing level at each of the plurality of points on the image based on the first focusing amount and the second focusing amount.

A focusing measurement method according to a third embodiment includes the steps of generating, with respect to a captured image, blurred images by using each pair of filters having different frequency characteristics; extracting, at each of specific points on the image, a first feature quantity and a second feature quantity both from the image and the respective blurred images; and calculating, from the first feature quantity and the second feature quantity, a focusing amount indicating a degree of in-focus to measure a focusing level at each of the specific points on the image.

A focusing measurement method according to a fourth embodiment includes the steps of generating, with respect to a captured image, a first blurred image group by using each pair of filters having different frequency characteristics; generating, with respect to the image, a second blurred image group by using each pair of filters having different frequency characteristics to each other, the frequency characteristics being a low frequency side relative to those of the pair of filters in the first filter section; calculating, at each of a plurality of points on the image, a first focusing amount indicating a degree of in-focus based on a pair of feature quantities each extracted from the image and each of images of the first blurred image group; calculating, at each of the plurality of points on the image, a second focusing amount based on a pair of feature quantities each extracted from the image and each of images of the second blurred image group; and measuring a focusing level at each of the plurality of points on the image based on the first focusing amount and the second focusing amount.

EFFECTS

According to the present application, it is possible to accurately conduct a focusing measurement also in a measurement of focusing level of an image having a large luminance difference. Further, according to the present invention, it is possible to accurately conduct a focusing measurement also in a measurement of focusing level of an image having a high ISO sensitivity.

DETAILED DESCRIPTION OF THE EMBODIMENTS

<<First Embodiment>>

Figure 1:
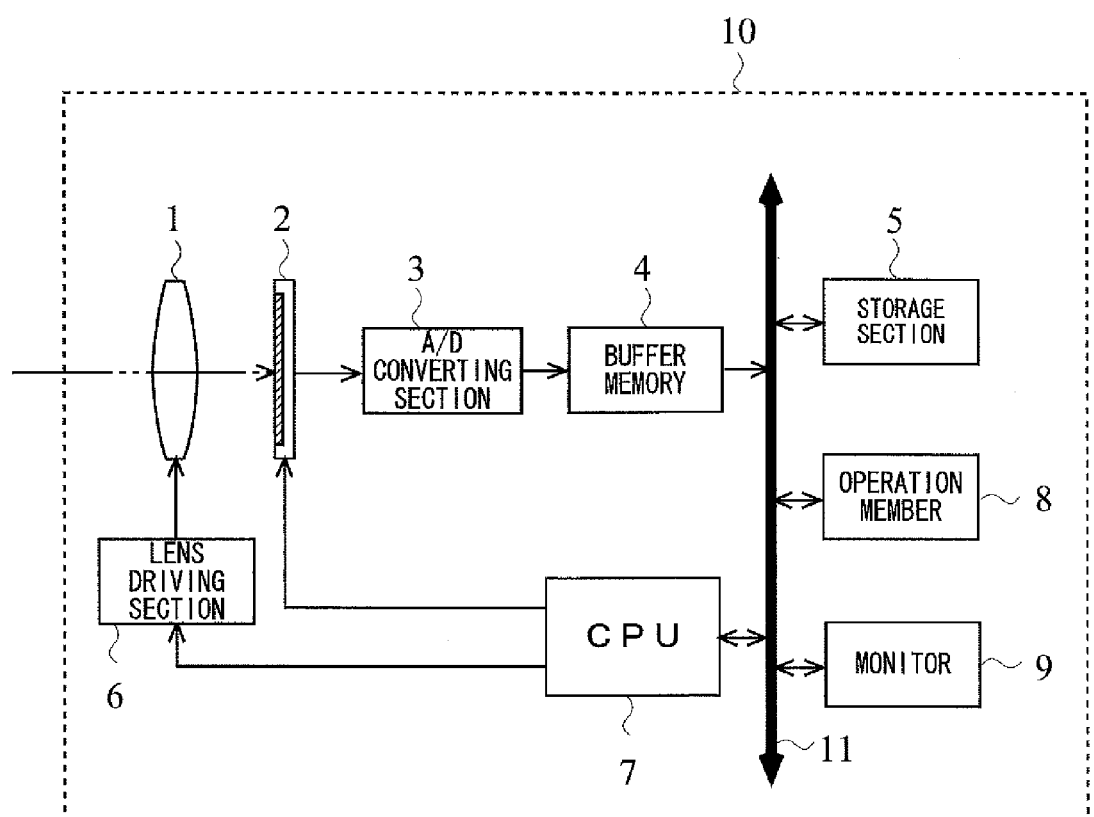
FIG. 1 is a view showing a structure of an electronic camera according to the present first embodiment.

FIG. 1 is a structural diagram of an electronic camera 10 according to a first embodiment of the present invention. The electronic camera 10 is formed of an imaging lens 1, an imaging element 2, an A/D converting section 3, a buffer memory 4, a storage section 5, a lens driving section 6, a CPU 7, an operation member 8, and a monitor 9. The lens driving section 6 for the imaging lens 1 and the imaging element 2 are respectively coupled to the CPU 7. Meanwhile, the buffer memory 4, the storage section 5, the CPU 7, the operation member 8, and the monitor 9 are coupled via a bus 11 so as to be capable of transmitting information.

Light from a subject is formed on an image forming surface of the imaging element 2 by the imaging lens 1. The imaging element 2 captures an image in accordance with an instruction from the CPU 7. A CCD or CMOS semiconductor image sensor or the like can be appropriately selected and used as the imaging element 2.

The A/D converting section 3 performs A/D conversion on an image signal output from the imaging element 2, and outputs a digital signal of the image.

The buffer memory 4 temporarily stores and holds the image of a subject image captured by the imaging element 2 and on which the A/D conversion is performed.

The lens driving section 6 moves, based on an instruction from the CPU 7, the imaging lens 1 to an optimum position at which an in-focus is achieved.

In accordance with an instruction from the CPU 7, the storage section 5 stores the image held in the buffer memory 4 via the bus 11. The image is stored in various formats such as bitmap format, jpeg format, and tiff format. Further, the storage section 5 stores a focusing measurement program and the like executed by the CPU 7. The image, the program and the like stored in the storage section 5 can be appropriately referred to from the CPU 7 via the bus 11. A storage device such as a commonly used hard disk device, a magneto-optic disk device, or a removable memory card can be selected and used as the storage section 5.

The CPU 7 executes the focusing measurement program stored in the storage section 5, and conducts the focusing measurement by appropriately reading the image stored in the buffer memory 4 or the storage section 5. Based on the measurement result, the CPU 7 transmits an instruction, to the lens driving section 6, to make the imaging lens 1 move to an optimum position at which the in-focus is achieved. At the same time, the CPU 7 stores the measurement result in the storage section 5 or outputs the result to the monitor 9. A commonly used computer's CPU can be used as the CPU 7.

The operation member 8 sends, to the CPU 7, an operation signal in accordance with the contents of operation of a member made by a user. The operation member 8 includes operation members such as, for instance, a mode setting button for setting a photographing mode and the like, a zoom setting button, and a release button.

The monitor 9 displays a photographed image, a mode setting screen and the like. A liquid crystal monitor or the like can be appropriately selected and used as the monitor 9.

Figure 2:
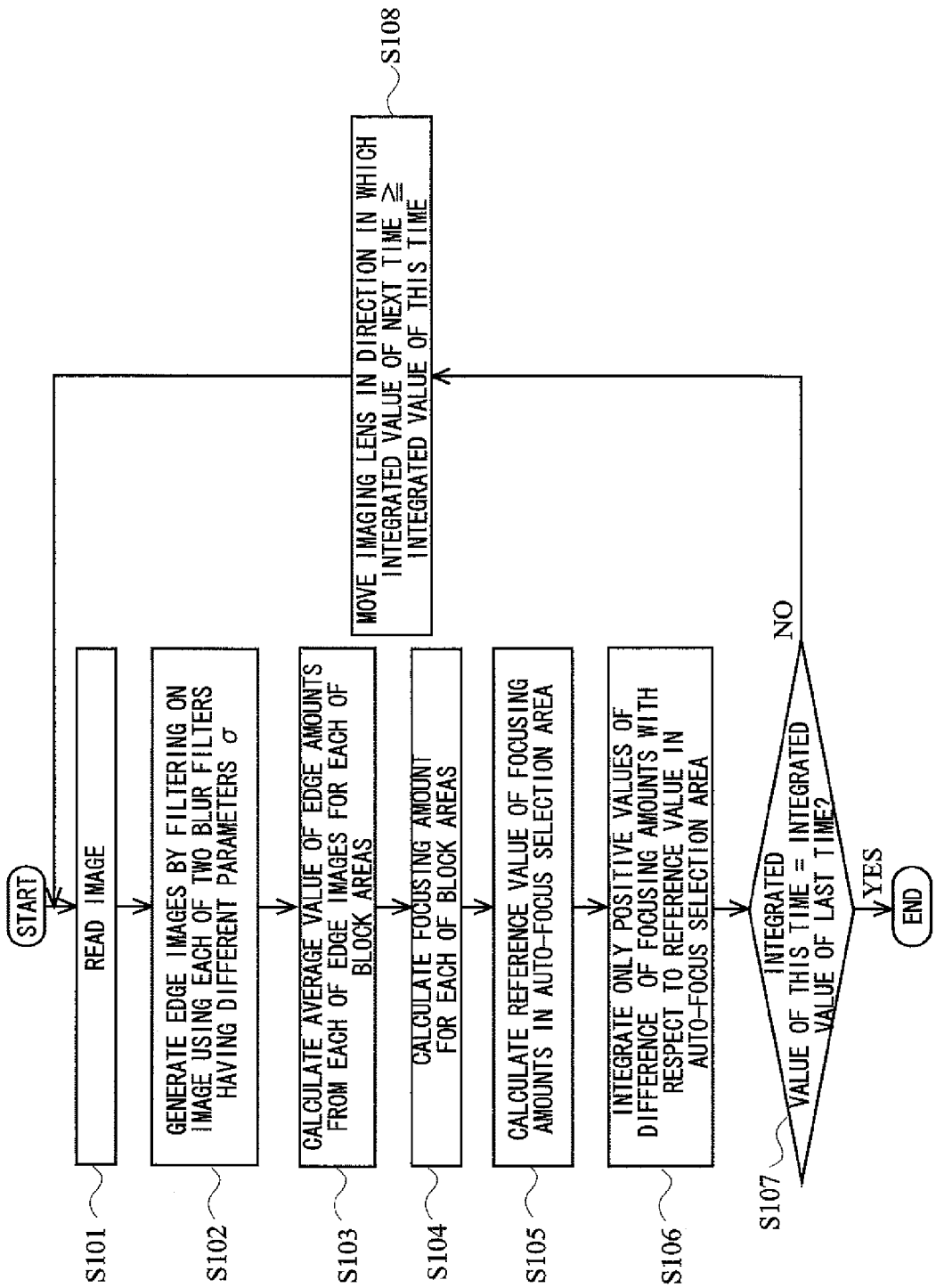
FIG. 2 is a flow chart showing a procedure of focusing measurement according to the present first embodiment.

Next, a procedure of focusing measurement according to the present first embodiment will be described with reference to a flow chart in FIG. 2.

Concretely, when a user half-presses the release button of the operation member 8, an instruction of focusing measurement for capturing an image of a subject is transmitted to the CPU 7. The CPU 7 executes the focusing measurement program stored in the storage section 5. As a result of this, processing of step S101 to step S108 in FIG. 2 is carried out. Note that in the present first embodiment, the subject to be captured by the electronic camera 10 is set as a scenery around a soccer goal as in FIG. 3. An auto-focus selection area 20 to be a reference for focusing is set at grass at the foot of the soccer goal.

In step S101, the CPU 7 makes the imaging element 2 capture a subject image formed on the image forming surface of the imaging element 2 by the imaging lens 1 at a current position. The captured image is held in the buffer memory 4 via the A/D converting section 3. The CPU 7 directly reads the captured image from the buffer memory 4.

In step S102, the CPU 7 extracts two edge amounts from the captured image. The CPU 7 performs smoothing processing on the image by using each of two Gaussian type blur filters $P(r) \propto \exp(-r^2/2\sigma^2)$ each having a different parameter $\sigma$ indicating a frequency characteristic, to thereby generate blurred images. By obtaining a difference between the captured image and the respective blurred images, the CPU 7 generates two edge images indicating a distribution of the edge amounts. The CPU 7 holds the two edge images in the storage section 5.

Note that values of the two parameters $\sigma$ can be arbitrarily selected. It is preferable to select the values which are close to each other. The reason is as follows. A value of the edge amount in an area in which the image is out-of-focus is hardly changed even if the parameter $\sigma$ of the blur filter P is changed a little. On the other hand, a value of the edge amount in an area in which the image is in-focus is largely changed if the parameter $\sigma$ of the blur filter P is changed a little. Specifically, a focusing amount representing a edge displacement amounts being a difference of two edge images to be determined in later-described step S104 takes a larger value in the area in which the in-focus is achieved than a value in the area in which the out-of-focus occurs, resulting in that the measurement of focusing level becomes easy. Therefore, $\sigma$ are set as 0.5 and 0.6 in the present first embodiment.

In step S103, the CPU 7 divides each of the edge images obtained in step S102 into block areas each having a size of 30 pixels×30 pixels, for instance. For each of the block areas of each of the edge images, the CPU 7 integrates edge amounts of all pixels included in the block area and divides the integrated value by the number of all pixels, to thereby calculate an average value of the edge amounts. Accordingly, a feature of each of the block areas can be represented by one value.

In step S104, the CPU 7 divides, for each of the block areas, a difference of average values of the two edge amounts determined in step S103 by an average value of the edge amounts in the same block area determined by using a that equals to 0.5. The CPU 7 holds the calculated value in the storage section 5 as the focusing amount in each of the block areas. Note that in the present first embodiment, the focusing amount is set as a value determined by dividing the difference of the average values of the two edge amounts by the average value of the edge amounts in the same block area determined by using $\sigma$ that equals to 0.5, but, it can also be set as a value determined by dividing the difference by an average value of the edge amounts in the same block area determined by using $\sigma$ that equals to 0.6, or by an average value of the average value of the edge amounts determined by using $\sigma$ that equals to 0.5 and the average value of the edge amounts determined by using $\sigma$ that equals to 0.6.

In step S105, the CPU 7 determines an average value of focusing amounts in the auto-focus selection area 20 by using the focusing amounts in the block areas included in the auto-focus selection area 20 among the focusing amounts determined in step S104. The CPU 7 holds the determined average value in the storage section 5 as a reference value of the focusing amounts.

Figure 3:
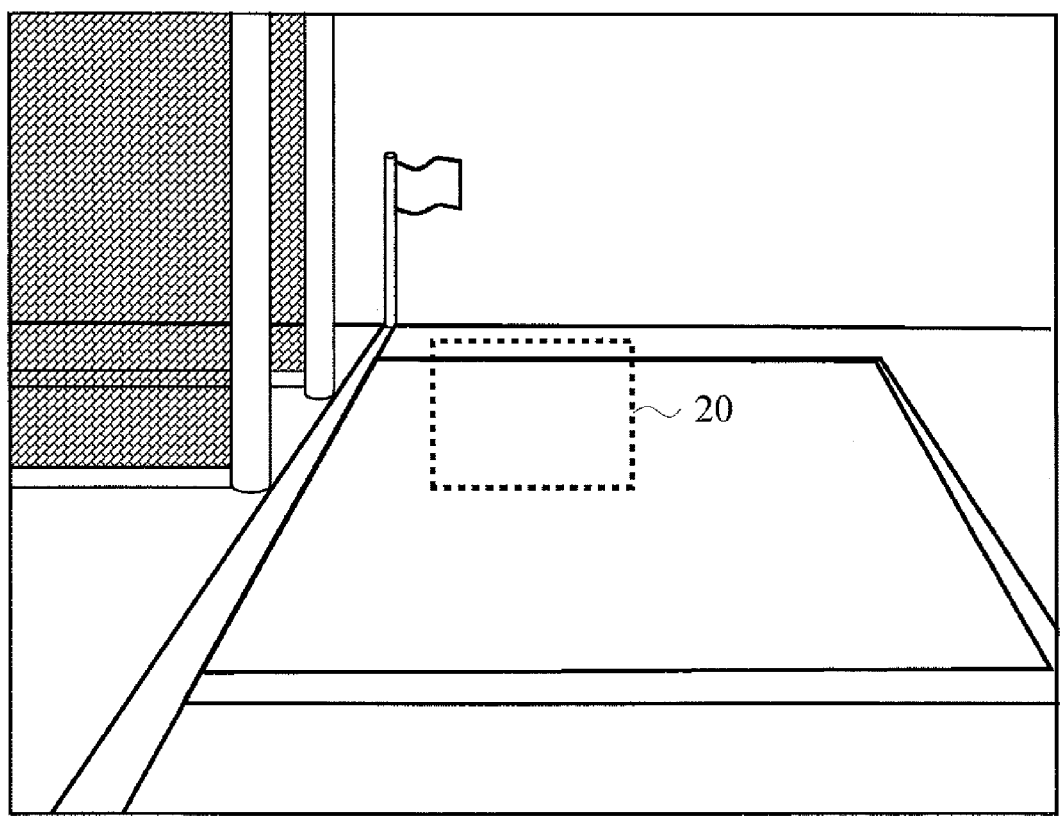
FIG. 3 is a view showing that a soccer goal and grass are arranged in a field of view when capturing an image in the present first embodiment.
Figure 4:
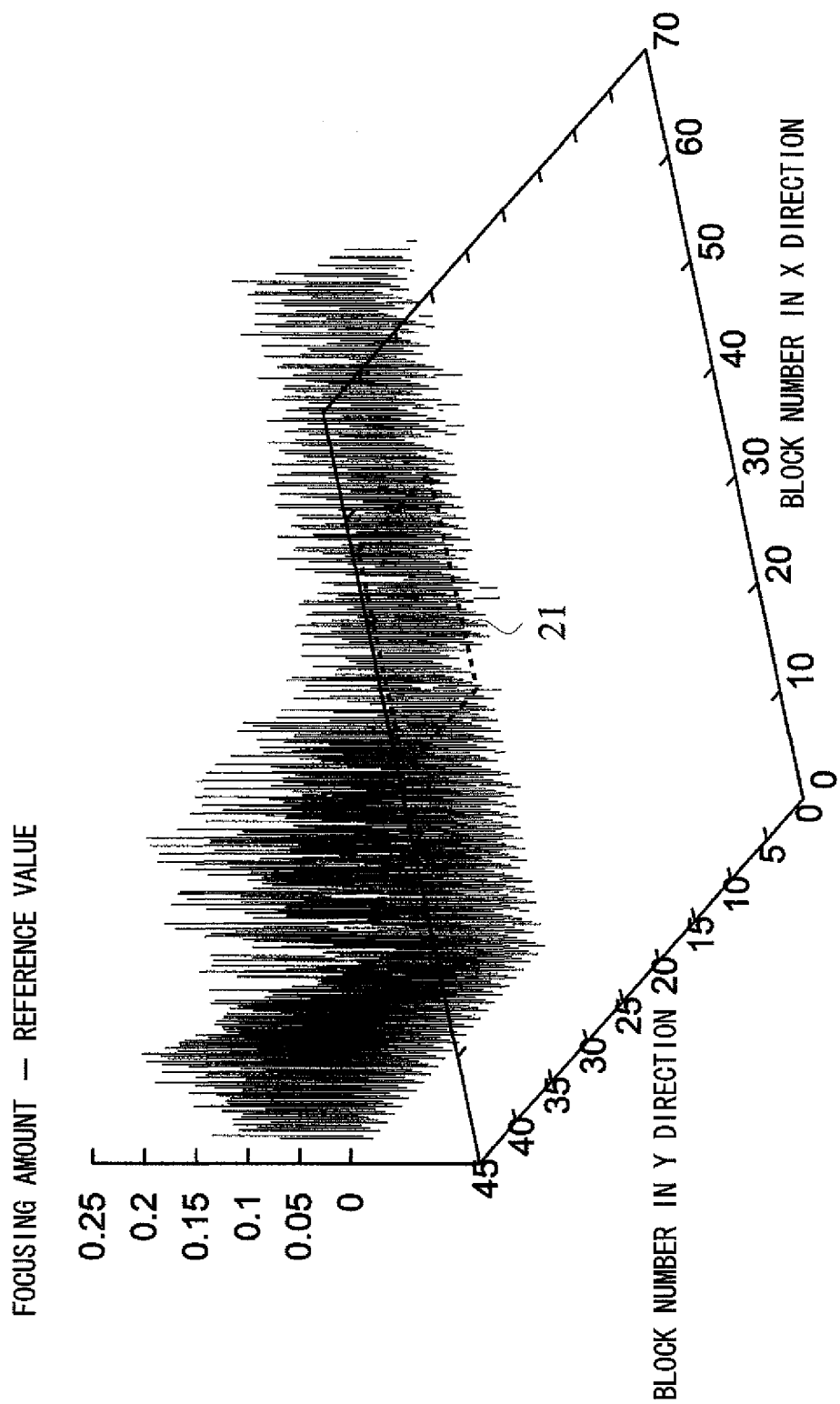
FIG. 4 is a view three-dimensionally showing a distribution of difference having positive values among a difference of focusing amounts with respect to a reference value in each block area of a captured image of FIG. 3.

FIG. 4 three-dimensionally shows a distribution of positive values of a difference (focusing amount minus reference value) obtained for each of the block areas. The focusing amount in the present first embodiment is set as a value determined by dividing the difference of the average values of the two edge amounts by the average value of the edge amounts in the same block area determined by using $\sigma$ that equals to 0.5, so that the values are uniformly distributed not only in the periphery of the soccer goal having luminance differences but also in the place of grass at the foot of the goal to be focused in which the contrast is low. In a blurred area other than the above in which the out-of-focus occurs, the focusing amount takes a smaller value than the reference value as described above, so that it is not shown in the drawing. Note that in a plane of FIG. 4 in which the focusing amount equals to the reference value, an area corresponding to the auto-focus selection area 20 in FIG. 3 is denoted by 21.

In step S106, the CPU 7 determines an integrated value obtained by integrating only the positive values of the difference (focusing amount minus reference value) in each of the block areas in the auto-focus selection area 20.

In step S107, the CPU 7 determines whether the in-focus is achieved or not based on a comparison of the integrated value determined in step S106 which is used as an evaluated value for focusing level determination with an evaluated value determined last time. Note that as the reference value used in step S106 at this time, the same value can also be used for each image. Since the focusing amount becomes larger as the degree of in-focus becomes higher, when the integrated value determined in step S106 takes the largest value in a targeted area, namely, when the evaluated value of this time and the evaluated value of the last time coincide with each other, it means that the imaging lens 1 is in the optimum position at which the in-focus is achieved. If the evaluated value of this time and the evaluated value of the last time coincide with each other, the CPU 7 determines that the imaging lens 1 is in the optimum position at which the in-focus is achieved. In order to notify the user that the in-focus is achieved, the CPU 7 performs display on the monitor 9 using symbols, characters, and the like, for instance. The CPU 7 then terminates the focusing measurement. On the other hand, if the evaluated values do not coincide with each other, the processing proceeds to step S108 (NO side). Note that when the measurement is just started, the evaluated value of the last time does not exist, so that step S107 is skipped and the processing directly proceeds to step S108 in the present first embodiment.

In step S108, the CPU 7 moves the position of the imaging lens 1 through the lens driving section 6 so that the evaluated value in the auto-focus selection area 20 takes the largest value. Concretely, when the evaluated value of this time is larger than the evaluated value of the last time, the imaging lens 1 is moved in the same direction as that of the last time, and when the evaluated value of this time is smaller than the evaluated value of the last time, the imaging lens 1 is moved in the opposite direction to that of the last time. The amount by which the imaging lens 1 is moved by the lens driving section 6 is determined in accordance with a difference between the evaluated value of this time and the evaluated value of the last time, for example. Subsequently, the processing proceeds to step S101 to conduct the focusing measurement by capturing the next image. An operation from step S101 to step S108 is performed until it becomes that the evaluated value of this time equals to the evaluated value of the last time. When the evaluated value takes the largest value, the CPU 7 determines that the imaging lens 1 is in the optimum position at which the in-focus is achieved, and terminates the focusing measurement.

As described above, in the present first embodiment, by generating the two edge images by using, with respect to the image, the two blur filters P having the different parameters σ indicating the frequency characteristics and calculating the focusing amount based on the difference of the images, it becomes possible to conduct the accurate measurement of focusing level when capturing an image of the subject even if the large luminance difference exists.

<<Second Embodiment>>

Figure 5:
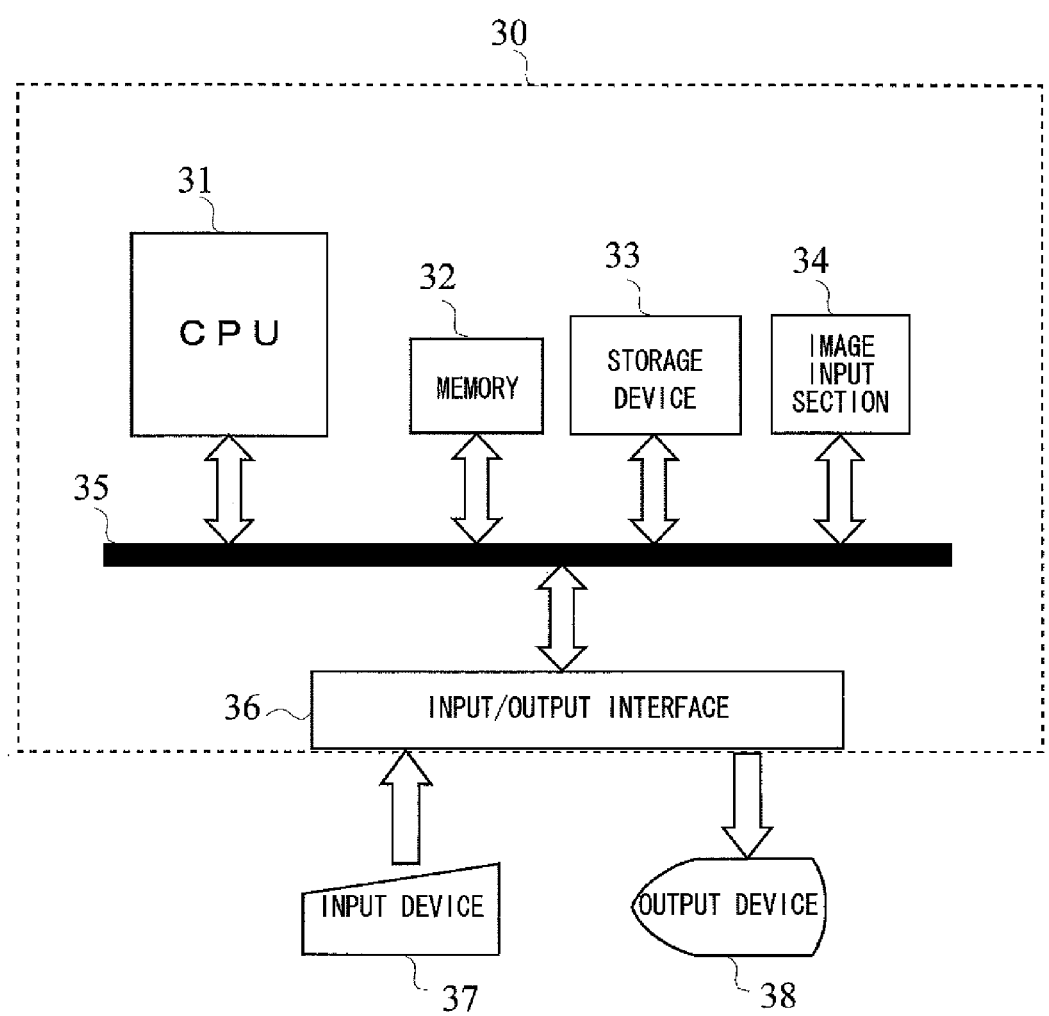
FIG. 5 is a view showing a structure of a focusing measurement device according to the present second embodiment.

FIG. 5 is a structural diagram of a focusing measurement device 30 according to a second embodiment of the present invention. The focusing measurement device 30 according to the second embodiment includes a CPU 31, a memory 32, a storage device 33, an image input section 34, and an input/output interface 36. The CPU 31, the memory 32, the storage device 33, the image input section 34, and the input/output interface 36 are coupled via a bus 35 so as to be capable of transmitting information. Further, an input device 37 and an output device 38 are coupled via the input/output interface 36.

The CPU 31 receives a start instruction and an initial setting made by a user from the input device 37 via the input/output interface 36, and executes a focusing measurement program held in the memory 32. The CPU 31 appropriately reads image data stored in the storage device 33 or the image input section 34, and conducts the focusing measurement. A result of this focusing measurement is stored in the storage device 33, and is displayed, at the same time, on the output device 38 via the input/output interface 36. A commonly used computer's CPU can be used as the CPU 31.

The memory 32 is used for holding the focusing measurement program, and for temporarily storing an in-progress processing result in accordance with the focusing measurement performed by the CPU 31 and various data from the respective components. A commonly used semiconductor memory can be used as the memory 32.

The storage device 33 stores and holds the image data to be a processing target in the CPU 31. The image data is held in various formats such as bitmap format, jpeg format, and tiff format. The data held in the storage device 33 can be appropriately referred to from the CPU 31 via the bus 35. A storage device such as a commonly used hard disk device, a magneto-optic disk device, or a removable memory card can be selected and used as the storage device 33.

The image input section 34 is used to input the image data to be the processing target. In the image input section 34, insertion ports for a USB cable, a memory card and the like, are provided. Further, the input of image to the focusing measurement device 30 is conducted through a device (a scanner, a digital camera, a digital video, or the like) coupled via the USB cable or the like, or through the memory card or the like inserted into the insertion port. The image data input from the image input section 34 may be transferred and held in the large capacity storage device 33 via the bus 35, or may be directly read by the CPU 31.

The input/output interface 36 is used to transmit the start instruction and the initial setting from the input device 37 to the CPU 31 and to send the processing result from the CPU 31 to the output device 38.

The input device 37 is used when the user makes an execution start instruction of an image processing program and performs an initial setting operation and the like. A commonly used keyboard, mouse, or the like can be used as the input device 37.

The output device 38 displays an in-progress state of the processing or a result of the processing sent from the CPU 31, as information capable of being checked by the user. A monitor, a printer, or the like can be used as the output device 38.

Figure 6:
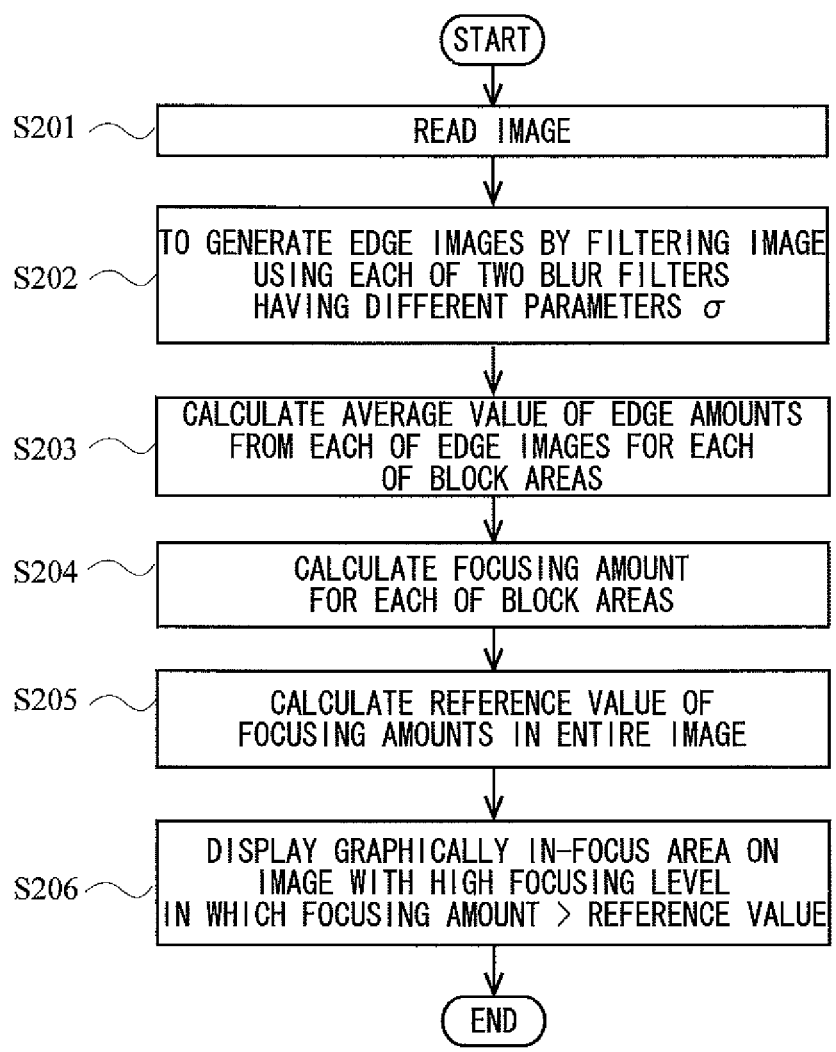
FIG. 6 is a flow chart showing a procedure of focusing measurement according to the present second embodiment.

Hereinafter, the focusing measurement device 30 according to the present second embodiment will be described along a flow chart in FIG. 6.

Concretely, a user uses the input device 37 to perform initial setting and the like and to make a start instruction by inputting a command of a focusing measurement program. Upon receiving the instruction through the input/output interface 36, the CPU 31 of the focusing measurement device 30 executes the focusing measurement program stored in the memory 32. As a result of this, processing of step S201 to step S206 in FIG. 6 is performed. Note that in the description herein below, it is assumed that a plurality of pieces of image data are previously stored in the storage device 33 of the focusing measurement device 30.

In step S201, the CPU 31 reads one image from the storage device 33 and holds it in the memory 32.

In step S202, the CPU 31 extracts two edge amounts from the image. The CPU 31 performs smoothing processing on the image by using each of two Gaussian type blur filters P each having a different parameter σ indicating a frequency characteristic, to thereby generate blurred images. By obtaining a difference between the image and the respective blurred images, the CPU 31 generates two edge images indicating a distribution of the edge amounts. The CPU 31 holds the two edge images in the memory 32. Note that σ are set as 0.5 and 0.6, as in the present first embodiment.

In step S203, the CPU 31 divides each of the edge images obtained in step S202 into block areas each having a size of 30 pixels×30 pixels, for instance. For each of the block areas of each of the edge images, the CPU 31 integrates edge amounts of all pixels included in the block area and divides the integrated value by the number of all pixels, to thereby calculate an average value of the edge amounts.

In step S204, the CPU 31 divides, for each of the block areas, a difference of the average values of the two edge amounts determined in step S203 by an average value of the edge amounts in the same block area determined by using σ that equals to 0.5. The CPU 31 holds the calculated value in the memory 32 as a focusing amount in each of the block areas.

In step S205, the CPU 31 determines an average value of focusing amounts in the entire image by using the focusing amounts determined in step S204. The CPU 31 holds the determined average value in the memory 32 as a reference value of the focusing amounts.

Figure 7:
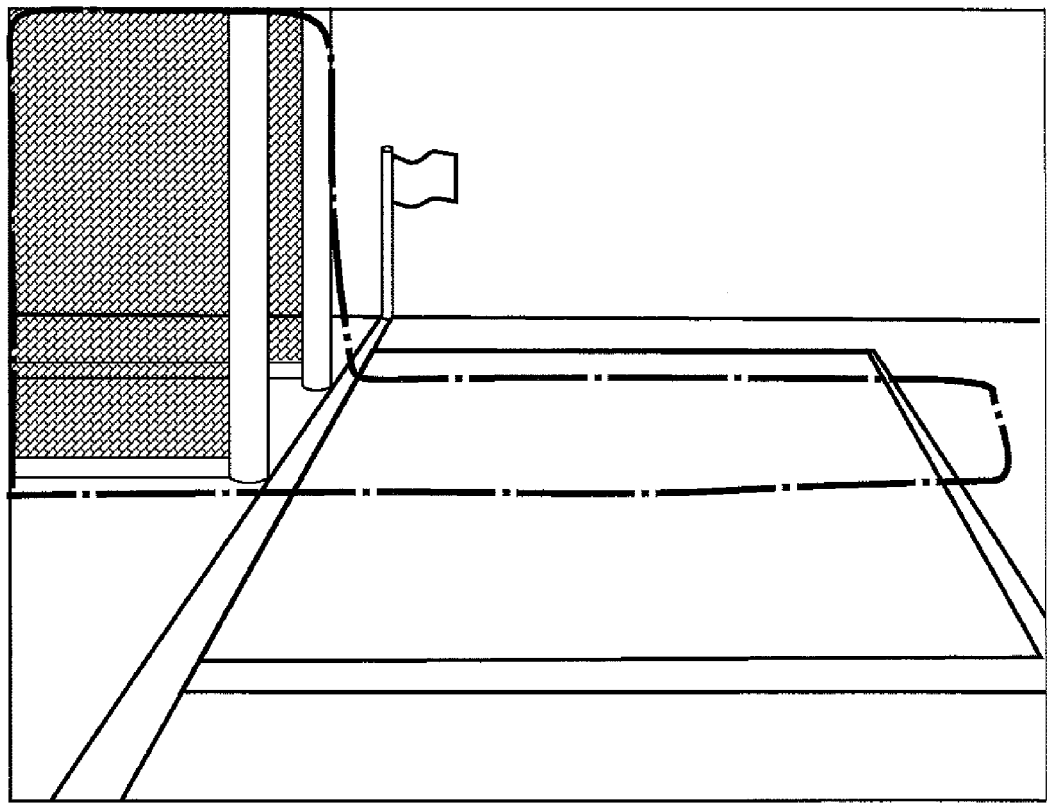
FIG. 7 is a view showing, by a line, an area having the focusing amounts whose values are larger than the reference value in the captured image of FIG. 3.

In step S206, the CPU 31 outputs the image to the output device 38 through the input/output interface 36. At the same time, the CPU 31 graphically shows by a line and the like, on the image output to the output device 38, an area having the focusing amounts whose values are larger than the reference value determined in step S205 as an area in which the in-focus is achieved, and terminates the focusing measurement. FIG. 7 is a view showing by a dotted line, when the image read in step S201 is the soccer goal in FIG. 3, an area having the focusing amounts whose values are larger than the reference value based on the distribution in FIG. 4.

<<Third Embodiment>>

Figure 8:
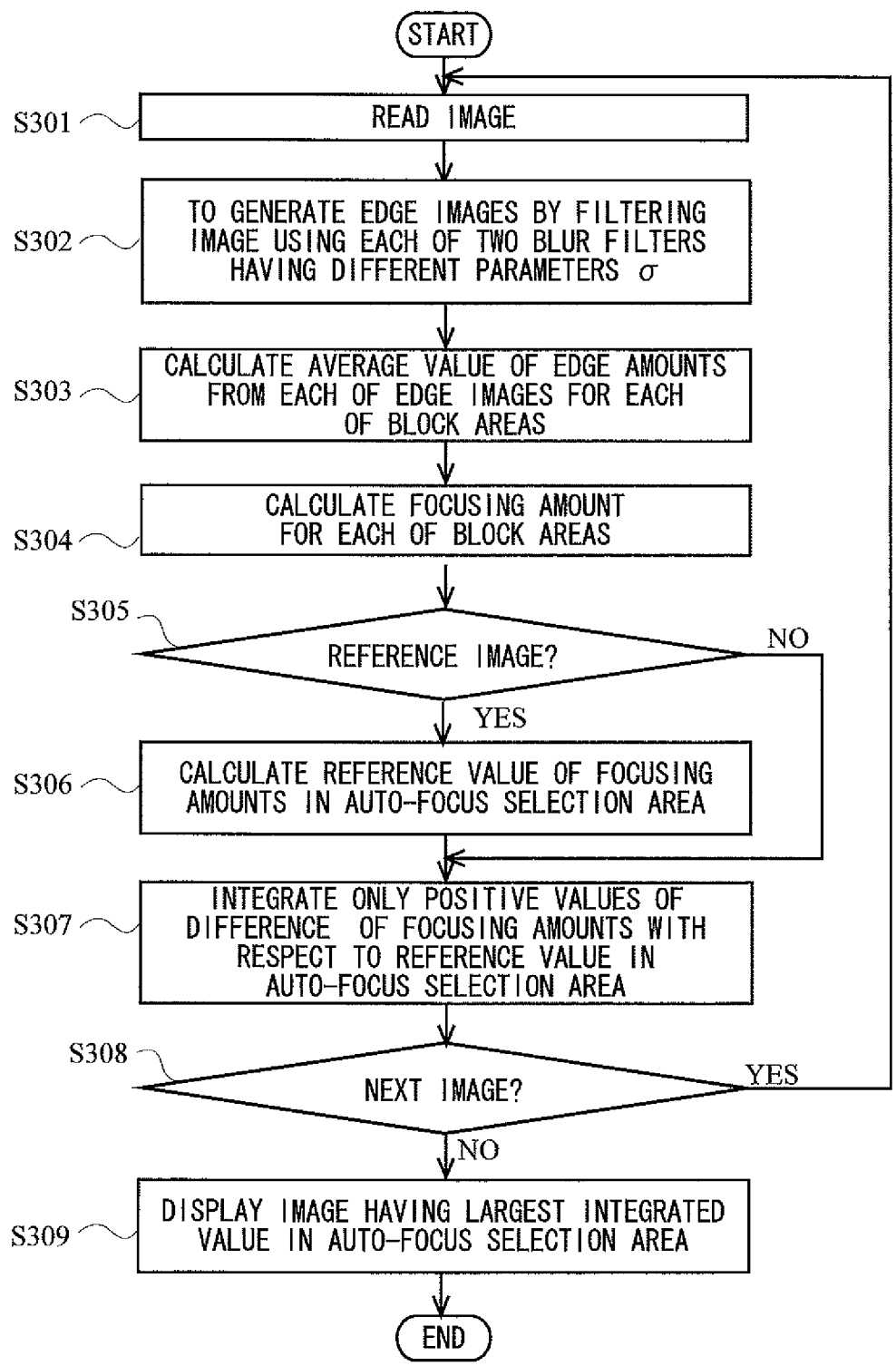
FIG. 8 is a flow chart showing a procedure of focusing measurement according to the present third embodiment.

FIG. 8 is a flow chart of processing in a focusing measurement device according to a third embodiment of the present invention.

The focusing measurement device according to the present third embodiment is basically the same as the focusing measurement device 30 according to the second embodiment in FIG. 5, so that an explanation regarding operations of respective components will be omitted. The point that the present third embodiment differs from the second embodiment is to select an image with the highest focusing level based on a reference value of one image to be a reference among a plurality of images captured through continuous shooting and the like.

Concretely, a user uses the input device 37 to perform initial setting and the like and to make a start instruction by inputting a command of a focusing measurement program, Upon receiving the instruction through the input/output interface 36, the CPU 31 of the focusing measurement device 30 executes the focusing measurement program stored in the memory 32. As a result of this, processing of step S301 to step S309 in FIG. 8 is performed. Note that in the description herein below, it is assumed that a plurality of images of the subject in FIG. 3 captured through continuous shooting are previously stored in the storage device 33 of the focusing measurement device 30.

In step S301, the CPU 31 reads one image from the storage device 33 and holds it in the memory 32. Note that in the present third embodiment, the first piece of image is set as a reference image.

In step S302, the CPU 31 extracts two edge amounts from the image. The CPU 31 performs smoothing processing on the image by using each of two Gaussian type blur filters P each having a different parameter σ indicating a frequency characteristic, to thereby generate blurred images. By obtaining a difference between the captured image and the respective blurred images, the CPU 31 generates two edge images indicating a distribution of the edge amounts. The CPU 31 holds the two edge images in the memory 32. Note that σ are set as 0.5 and 0.6, as in the present second embodiment.

In step S303, the CPU 31 divides each of the edge images obtained in step S302 into block areas each having a size of 30 pixels×30 pixels, for instance. For each of the block areas of each of the edge images, the CPU 31 integrates edge amounts of all pixels included in the block area and divides the integrated value by the number of all pixels, to thereby calculate an average value of the edge amounts.

In step S304, the CPU 31 divides, for each of the block areas, a difference of the average values of the two edge amounts determined in step S303 by an average value of the edge amounts in the same block area determined by using σ that equals to 0.5. The CPU 31 holds the calculated value in the memory 32 as a focusing amount in each of the block areas.

In step S305, the CPU 31 determines whether or not the image being a processing target is the reference image. If the image is the reference image, the processing proceeds to step S306 (YES side). If the image is not the reference image, the processing proceeds to step S307 (NO side).

In step S306, the CPU 31 determines an average value of focusing amounts in the auto-focus selection area 20 by using the focusing amounts in the block areas included in the auto-focus selection area 20 among the focusing amounts in the reference image determined in step S304. The CPU 31 holds the determined average value in the memory 32 as a reference value of the focusing amounts in the reference image.

In step S307, the CPU 31 determines an integrated value obtained by integrating only positive values of a difference (focusing amount minus reference value) in each of the block areas in the auto-focus selection area 20. The CPU 31 holds the integrated value in the memory 32.

In step S308, the processing proceeds to step S309 if the CPU 31 performs the processing on all of the images captured through the continuous shooting. If there still exists an unprocessed image, the processing proceeds to step S301 (YES side). The CPU 31 performs the processing from step S301 to step S308 on all of the images captured through the continuous shooting by using the reference value of the reference image determined in step S307, determines the integrated values of the respective images, and holds the values in the memory 32.

In step S309, the CPU 31 reads, from the memory 32, the integrated values of all of the images captured through the continuous shooting determined in step S307. The CPU 31 outputs the image having the largest integrated value as the most focused image to the output device 38 through the input/output interface 36, and terminates the focusing measurement.

<<Fourth Embodiment>>

An electronic camera according a fourth embodiment of the present invention is the same as the electronic camera 10 of the first embodiment shown in FIG. 1. Accordingly, an explanation regarding operations of respective components will be omitted, and the electronic camera according to the present fourth embodiment is also represented as the electronic camera 10. The point that the present fourth embodiment differs from the first embodiment is that a focusing measurement program to be used performs measurement of focusing level of an image based on an amount of edge displacement between high frequency components and low frequency components of the image.

Figure 10:
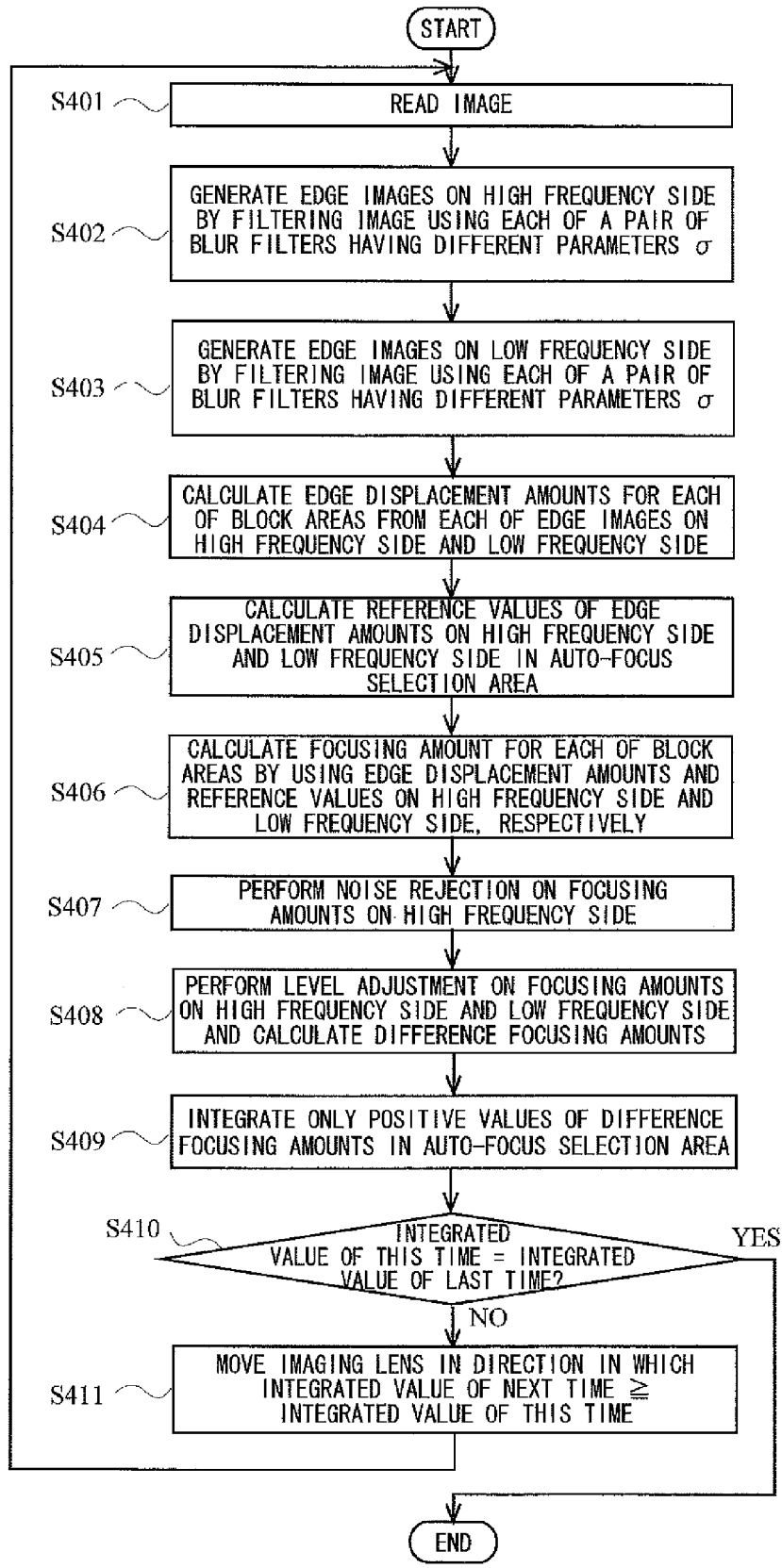
FIG. 10 is a flow chart showing a procedure of focusing measurement according to the present fourth embodiment.

A procedure of focusing measurement according to the present fourth embodiment will be described with reference to a flow chart in FIG. 10.

Concretely, when a user half-presses the release button of the operation member 8, an instruction of focusing measurement for capturing an image of a subject is transmitted to the CPU 7. The CPU 7 executes the focusing measurement program stored in the storage section 5. As a result of this, processing of step S401 to step S411 in FIG. 10 is carried out. Note that in the present fourth embodiment, the subject to be captured by the electronic camera 10 is set as a person and buildings being a background of the person in FIG. 11. An auto-focus selection area 40 to be a reference for focusing is set at a center of field of view.

In step S401, the CPU 7 makes the imaging element 2 capture a subject image formed on the image forming surface of the imaging element 2 by the imaging lens 1 at a current position. The captured image is held in the buffer memory 4 via the A/D converting section 3. The CPU 7 directly reads the captured image from the buffer memory 4.

In step S402, the CPU 7 extracts two edge amounts from the captured image. The CPU 7 performs smoothing processing on the image by using each of two Gaussian type blur filters $P(r) \propto \exp(-r^2/2\sigma^2)$ each having a different parameter σ indicating a frequency characteristic on a high frequency side, to thereby generate blurred images. By obtaining a difference between the captured image and the respective blurred images, the CPU 7 generates two edge images on the high frequency side indicating a distribution of the edge amounts. The CPU 7 holds the two edge images on the high frequency side in the storage section 5.

Note that values of the two parameters σ can be arbitrarily selected. It is preferable to select the values which are close to each other. The reason is as follows. A value of the edge amount in an area in which the image is out-of-focus is hardly changed even if the parameter σ of the blur filter P is changed a little. On the other hand, a value of the edge amount in an area in which the image is in-focus is largely changed if the parameter σ of the blur filter P is changed a little. Specifically, a focusing amount representing a edge displacement amounts being a difference of two edge images to be determined in later-described step S404 takes a larger value in the area in which the in-focus is achieved than a value in the area in which the out-of-focus occurs, resulting in that the measurement of focusing level becomes easy.

However, when an ISO sensitivity of the imaging element 2 is high, it is not possible to ignore the effect of noise of spike shape and the like from each pixel of the imaging element 2. Accordingly, a certain limitation is imposed on the selection of the parameters σ. Specifically, when the value of parameters σ is too small, the noise is erroneously extracted as the edge amount of the image. Meanwhile, when the value of parameter σ is too large, although the effect of noise becomes obscured by the effect of smoothing, it becomes hard to extract even the edge component of the image itself. Therefore, it is important to determine the values of parameters σ by taking these points into consideration. In the present fourth embodiment, the parameters σ on the high frequency side are set as 0.7 and 0.8.

In step S403, the CPU 7 performs smoothing processing on the image by using each of two Gaussian type blur filters P each having a different parameter σ indicating a frequency characteristic on a low frequency side, to thereby generate blurred images. By obtaining a difference between the captured image and the respective blurred images, the CPU 7 generates two edge images on the low frequency side indicating a distribution of the edge amounts. The CPU 7 holds the two edge images on the low frequency side in the storage section 5. In the present fourth embodiment, the parameters a on the low frequency side are set as 1.5 and 1.6.

In step S404, the CPU 7 calculates an absolute value of difference of the two edge images on the high frequency side and the low frequency side, respectively, obtained in step S402 and step S403. Subsequently, two-dimensional data of the calculated absolute value of difference is divided into block areas each having a size of 30 pixels×30 pixels, for instance, and an average value thereof is determined for each of the block areas. The CPU 7 holds the calculated average value in the storage section 5 as an amount of edge displacement.

In step S405, the CPU 7 determines an average value of the amounts of edge displacement on the high frequency side and the low frequency side, respectively, in the auto-focus selection area 40 by using the amounts of edge displacement in the block areas included in the auto-focus selection area 40 among the amounts of edge displacement on the high frequency side and the low frequency side determined in step S404. The CPU 7 holds the determined average values in the storage section 5 as reference values of the amounts of edge displacement on the high frequency side and the low frequency side, respectively.

In step S406, the CPU 7 subtracts the reference values determined in step S405 from the amounts of edge displacement of the respective block areas on the high frequency side and the low frequency side, respectively, determined in step S404. The CPU 7 holds the obtained values in the storage section 5 as focusing amounts of the respective block areas on the high frequency side and the low frequency side, respectively.

Figure 11:
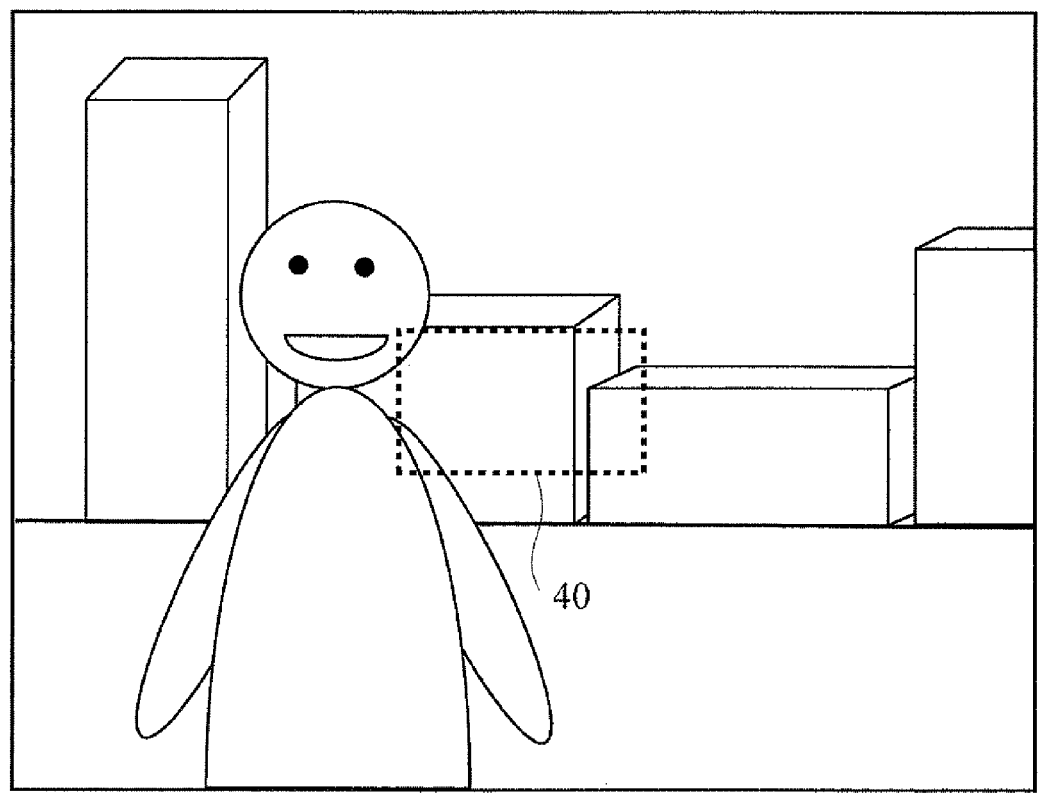
FIG. 11 is a view showing that a person and buildings are arranged in a field of view when capturing an image in the present fourth embodiment.
Figure 12:
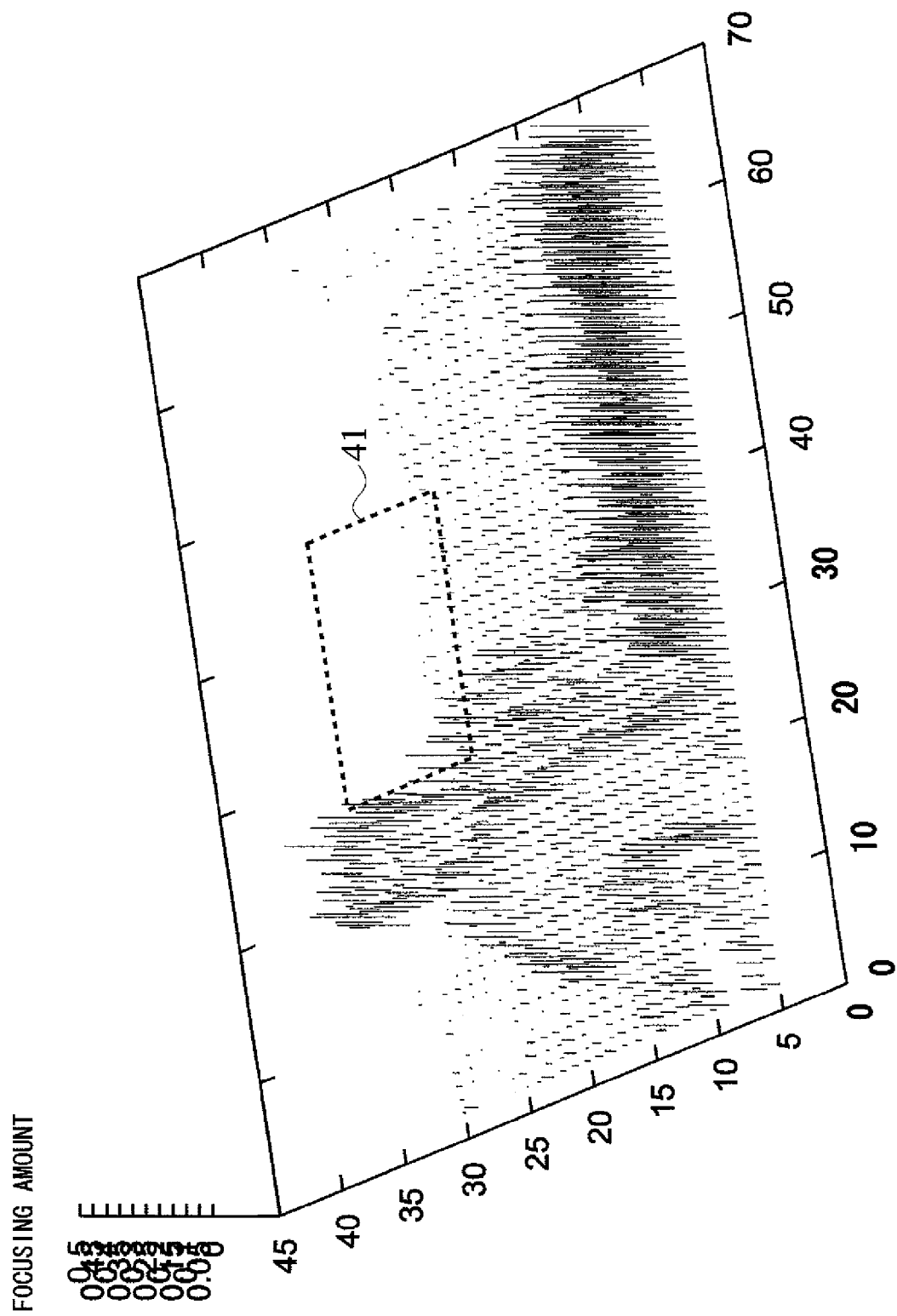
FIG. 12 is a view three-dimensionally showing a distribution of positive values of focusing amounts on a high frequency side in each block area of a captured image of FIG. 11.
Figure 13:
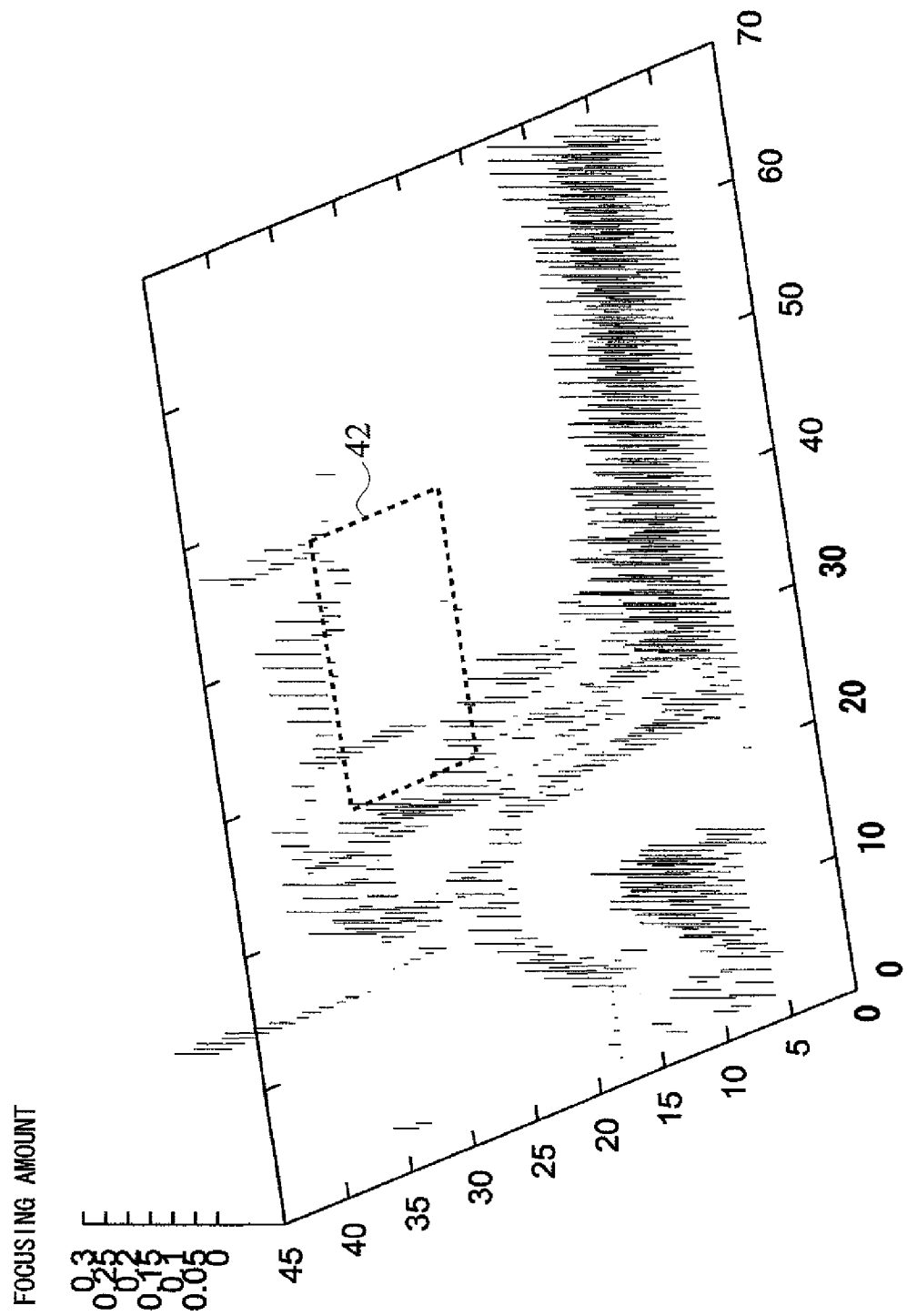
FIG. 13 is a view three-dimensionally showing a distribution of positive values of focusing amounts on a low frequency side in each block area of the captured image of FIG. 11.

FIG. 12 and FIG. 13 three-dimensionally show a distribution of positive values of the focusing amounts in the respective block areas on the high frequency side and the low frequency side, respectively. It can be understood that the values are basically distributed in a place where the person is positioned. However, in the distribution of focusing amounts on the high frequency side in FIG. 12, there exists the distribution of focusing amounts in the place where the person and the buildings being the background are positioned. Meanwhile, in the distribution of focusing amounts on the low frequency side in FIG. 13, there exists the distribution of focusing amounts in the place where the person and the sky being the background are positioned. The focusing amounts distributed in the place where the buildings and the sky being the background are positioned are generated mainly because of a noise of spike shape and the like from the pixels of the imaging element 2, due to the high ISO sensitivity of the imaging element 2. Such noise is rejected in the following step S407 and thereafter. Note that in a plane of FIG. 12 and FIG. 13 in which the focusing amount equals to 0 (zero), areas corresponding to the auto-focus selection area 40 in FIG. 11 are denoted by 41 and 42.

In step S407, the CPU 7 performs noise rejection in which the focusing amount influenced by the noise due to the high ISO sensitivity of the imaging element 2 is removed from the focusing amounts of the respective block areas on the high frequency side determined in step S406, as described above.

Figure 14:
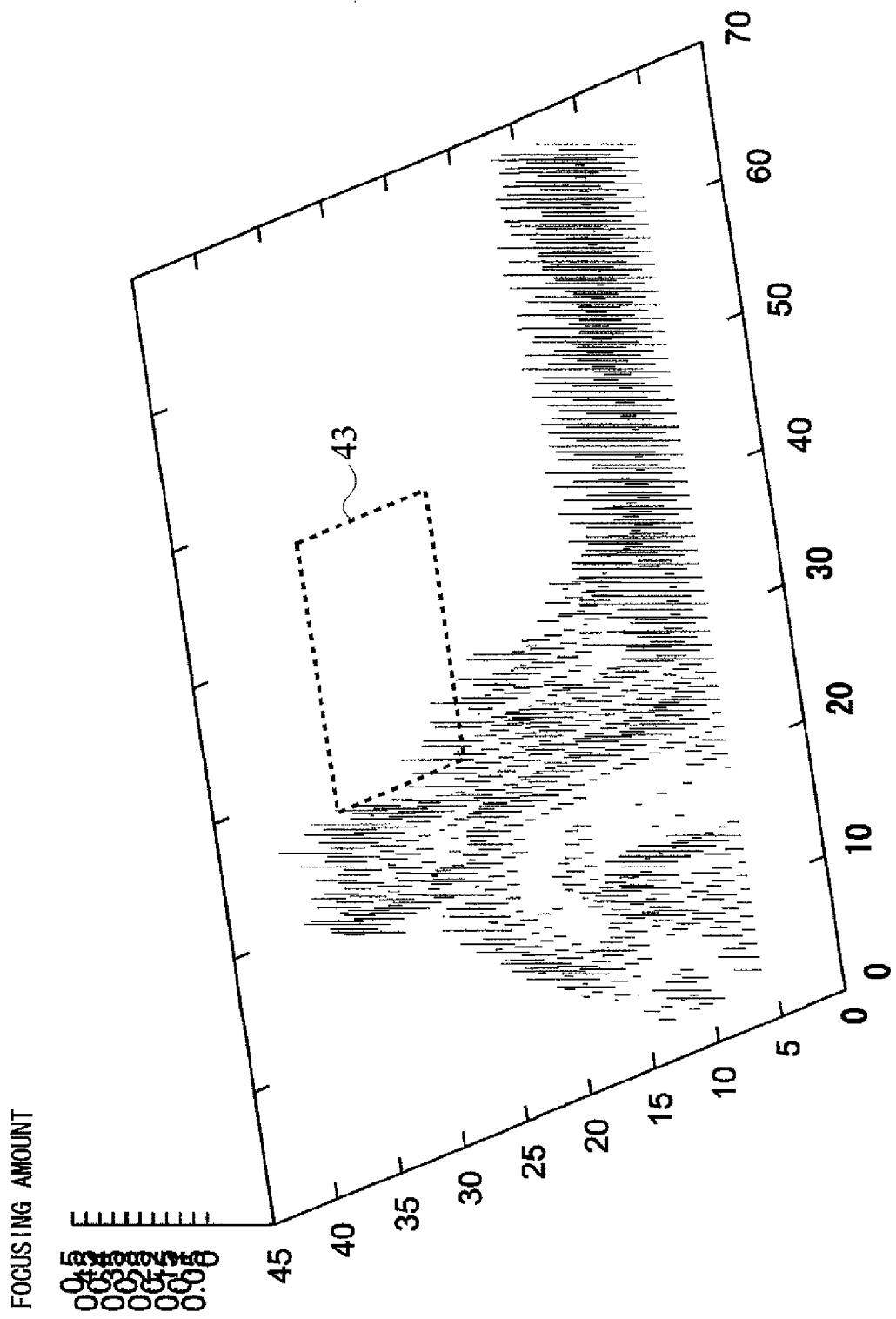
FIG. 14 is a view three-dimensionally showing a distribution of positive values of new focusing amounts on a high frequency side obtained as a result of performing noise rejection on the focusing amounts on the high frequency side in FIG. 12.

FIG. 14 shows a result of applying the noise rejection in step S407 in FIG. 12. When compared to FIG. 12, spike-shaped focusing amounts in the place where the buildings being the background are positioned are apparently decreased, so that it can be understood that the focusing amounts were generated by the noise. Note that in a plane of FIG. 14 in which the focusing amount equals to 0 (zero), an area corresponding to the auto-focus selection area 40 in FIG. 11 is denoted by 43.

In step S408, in order to calculate a difference of the focusing amounts on the high frequency side and the low frequency side, the CPU 7 performs level adjustment of values between the focusing amounts. After the level adjustment is performed, the CPU 7 obtains the difference of the focusing amounts on the high frequency side and the low frequency side for each of the block areas. With the difference as described above, it is possible not only to perform the noise rejection in step S407 but also to remove components ascribable to the noise and edge components in a blurred portion. The CPU 7 holds the determined value in the storage section 5 as a difference focusing amounts in each of the block areas.

Figure 15:
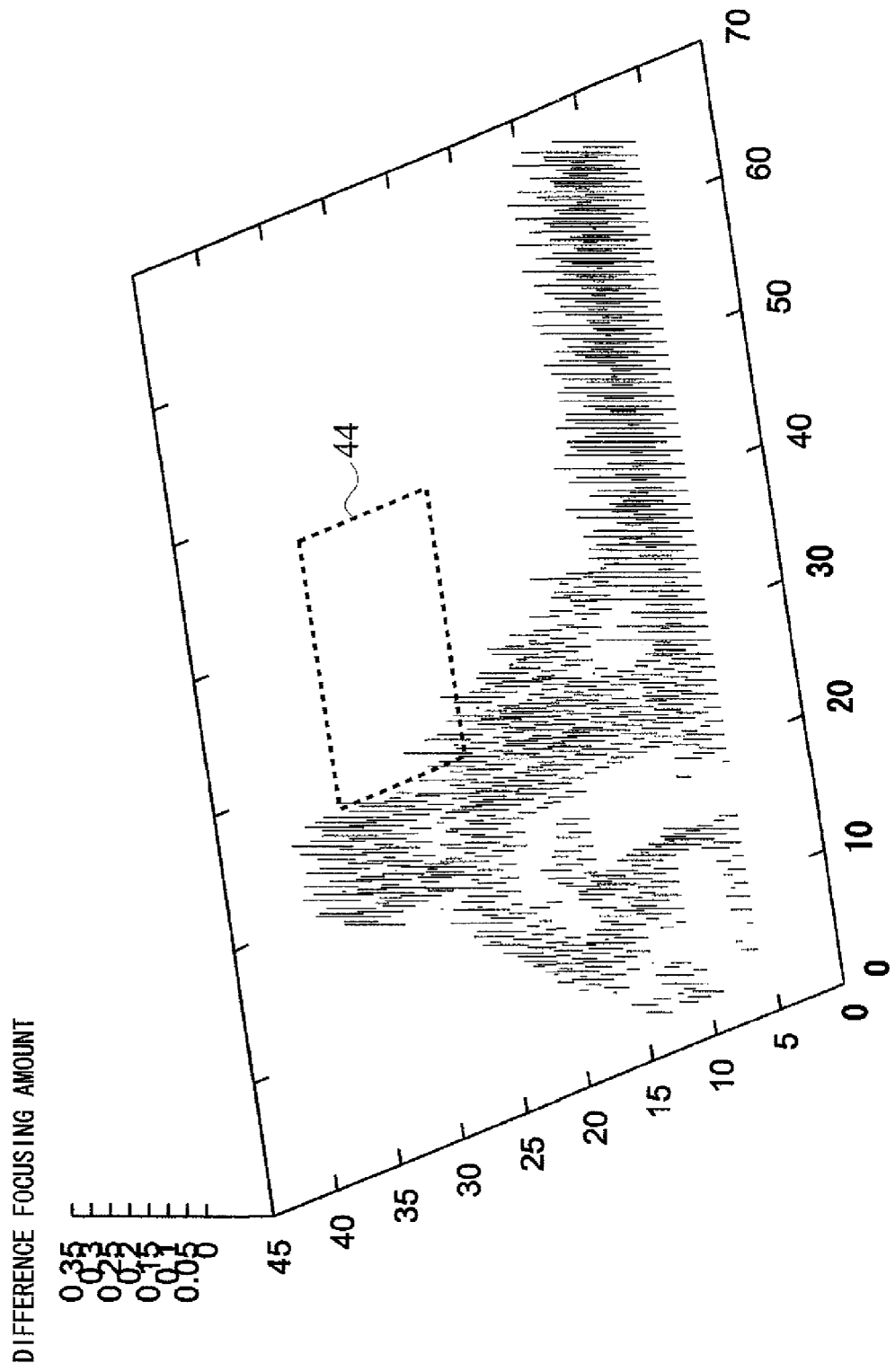
FIG. 15 is a view three-dimensionally showing a distribution of positive values of a difference focusing amounts between the focusing amounts on the high frequency side in FIG. 14 and the focusing amounts in FIG. 13.

FIG. 15 three-dimensionally shows a distribution of positive values of a difference focusing amounts determined by subtracting the focusing amounts on the low frequency side in FIG. 13 from the focusing amounts on the high frequency side in FIG. 14, for each of the block areas. Note that in a plane of FIG. 15 in which the difference focusing amounts equals to 0 (zero), an area corresponding to the auto-focus selection area 40 in FIG. 11 is denoted by 44.

In step S409, the CPU 7 determines an integrated value obtained by integrating only the positive values of the difference focusing amounts in each of the block areas in the auto-focus selection area 40.

In step S410, the CPU 7 determines whether the in-focus is achieved or not based on a comparison of the integrated value determined in step S409 which is used as an evaluated value for focusing level determination with an evaluated value determined last time. Since the focusing amount becomes larger as the degree of in-focus becomes higher, when the integrated value determined in step S409 takes the largest value, namely, when the evaluated value of this time and the evaluated value of the last time coincide with each other, it means that the imaging lens 1 is in the optimum position at which the in-focus is achieved. If the evaluated value of this time and the evaluated value of the last time coincide with each other, the CPU 7 determines that the imaging lens 1 is in the optimum position at which the in-focus is achieved, and terminates the focusing measurement. In order to notify the user that the in-focus is achieved, the CPU 7 performs display on the monitor 9 using symbols, characters, and the like, for instance. The CPU 7 then terminates the focusing measurement. On the other hand, if the evaluated values do not coincide with each other, the processing proceeds to step S411 (NO side). Note that when the measurement is just started, the evaluated value of the last time does not exist, so that step S407 is skipped and the processing directly proceeds to step S411 in the present fourth embodiment.

In step S411, the CPU 7 moves the position of the imaging lens 1 through the lens driving section 6 so that the evaluated value in the auto-focus selection area 40 takes the largest value. Concretely, when the evaluated value of this time is larger than the evaluated value of the last time, the imaging lens 1 is moved in the same direction as that of the last time, and when the evaluated value of this time is smaller than the evaluated value of the last time, the imaging lens 1 is moved in the opposite direction to that of the last time. The amount by which the imaging lens 1 is moved by the lens driving section 6 is determined in accordance with a difference between the evaluated value of this time and the evaluated value of the last time, for example. Subsequently, the processing proceeds to step S401 to conduct the focusing measurement by capturing the next image. An operation from step S401 to step S411 is performed until it becomes that the evaluated value of this time equals to the evaluated value of the last time. When the evaluated value takes the largest value, the CPU 7 determines that the imaging lens 1 is in the optimum position at which the in-focus is achieved, and terminates the focusing measurement.

As described above, in the present fourth embodiment, the focusing amounts are calculated, on the high frequency side and the low frequency side, respectively, by applying each of the pair of blur filters P having the different parameters σ to the image, which enables to conduct the accurate measurement of focusing level when the large luminance difference exists and when capturing an image of the subject by a high ISO sensitivity of the imaging element.

Further, in the present fourth embodiment, the parameters σ of the blur filters P are adjusted in accordance with the ISO sensitivity of the imaging element, and the noise rejection is performed on the focusing amounts on the high frequency side, which enables to improve an accuracy of the focusing measurement.

<<Fifth Embodiment>>

A focusing measurement device according a fifth embodiment of the present invention is the same as the focusing measurement device 30 of the second embodiment shown in FIG. 5. Accordingly, an explanation regarding operations of respective components will be omitted, and the focusing measurement device according to the present fifth embodiment is also represented as the focusing measurement device 30. The point that the present fifth embodiment differs from the second embodiment is that a focusing measurement program to be used performs measurement of focusing level of an image based on an amount of edge displacement between high frequency components and low frequency components of the image.

Figure 16:
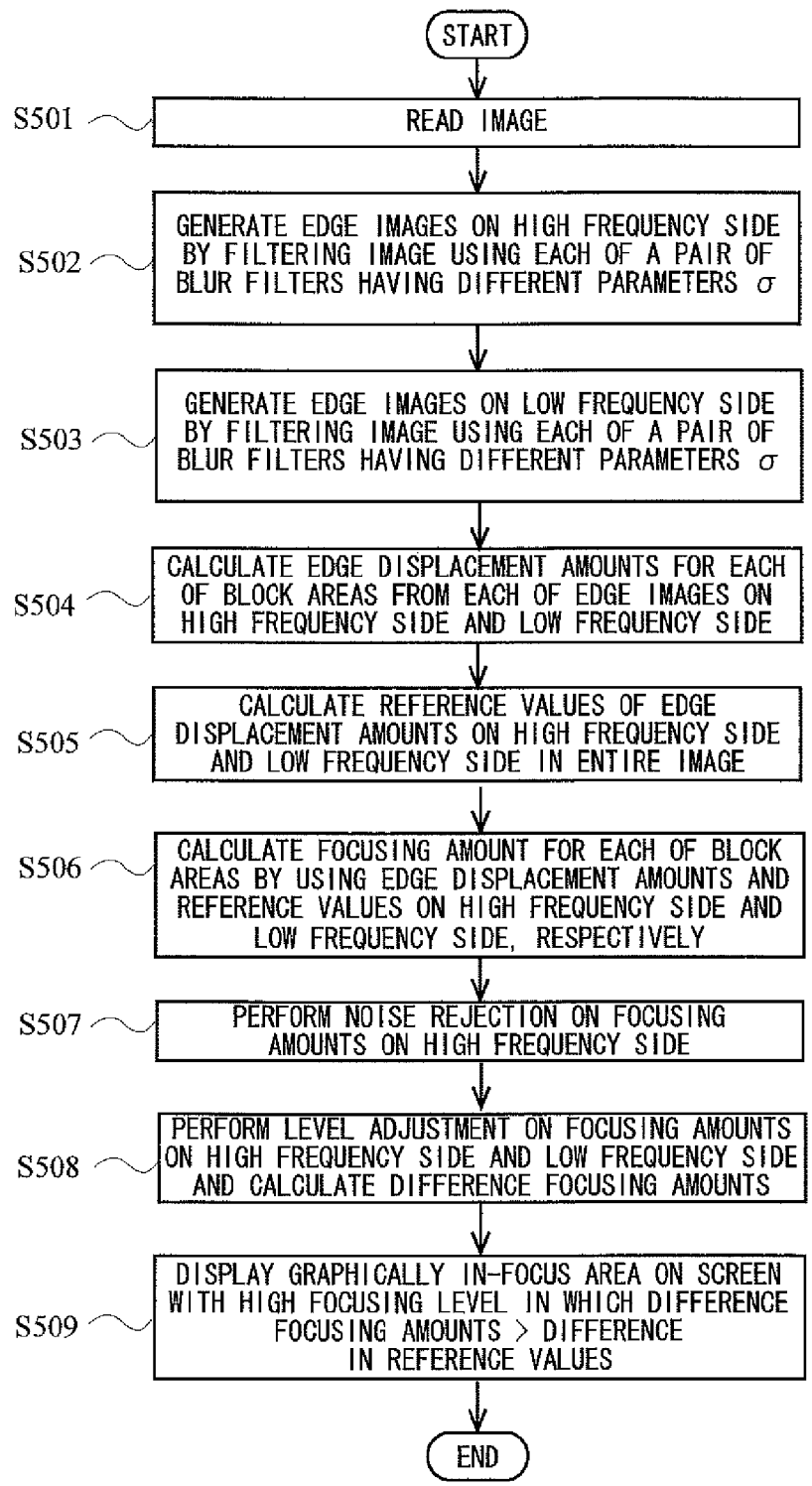
FIG. 16 is a flow chart showing a procedure of focusing measurement according to the present fifth embodiment.

Hereinafter, the focusing measurement device 30 according to the present fifth embodiment will be described along a flow chart in FIG. 16.

Concretely, a user uses the input device 37 to perform initial setting and the like and to make a start instruction by inputting a command of the focusing measurement program. Upon receiving the instruction through the input/output interface 36, the CPU 31 of the focusing measurement device 30 executes the focusing measurement program stored in the memory 32. As a result of this, processing of step S501 to step S509 in FIG. 16 is performed. Note that in the description herein below, it is assumed that a plurality of pieces of image data are previously stored in the storage device 33 of the focusing measurement device 30.

In step S501, the CPU 31 reads one image from the storage device 33 and holds it in the memory 32.

In step S502, the CPU 31 extracts two edge amounts from the captured image. The CPU 31 performs smoothing processing on the image by using each of two Gaussian type blur filters P each having a different parameter σ indicating a frequency characteristic on a high frequency side, to thereby generate blurred images. By obtaining a difference between the captured image and the respective blurred images, the CPU 31 generates two edge images on the high frequency side indicating a distribution of the edge amounts. The CPU 31 holds the two edge images on the high frequency side in the memory 32. Note that the parameters σ on the high frequency side are set as 0.7 and 0.8, as in the fourth embodiment.

In step S503, the CPU 31 performs, through the same procedure as that of step S502, smoothing processing on the image by using each of two Gaussian type blur filters P each having a different parameter σ indicating a frequency characteristic on a low frequency side, to thereby generate blurred images. By obtaining a difference between the captured image and the respective blurred images, the CPU 31 generates two edge images on the low frequency side indicating a distribution of the edge amounts. The CPU 31 holds the two edge images on the low frequency side in the memory 32. Note that the parameters σ on the low frequency side are set as 1.5 and 1.6, as in the fourth embodiment.

In step S504, the CPU 31 calculates an absolute value of difference of the two edge images on the high frequency side and the low frequency side, respectively, obtained in step S502 and step S503. Subsequently, two-dimensional data of the calculated absolute value of difference is divided into block areas each having a size of 30 pixels×30 pixels, for instance, and an average value thereof is determined for each of the block areas. The CPU 31 holds the calculated average value in the memory 32 as an amount of edge displacement.

In step S505, the CPU 31 determines an average value of the respective amounts of edge displacement in the entire image, by using the amounts of edge displacement on the high frequency side and the low frequency side determined in step S504. The CPU 31 holds the determined average values in the memory 32 as reference values of the amounts of edge displacement on the high frequency side and the low frequency side, respectively.

In step S506, the CPU 31 subtracts the reference values determined in step S505 from the amounts of edge displacement of the respective block areas on the high frequency side and the low frequency side, respectively, determined in step S504. The CPU 31 holds the obtained values in the memory 32 as focusing amounts of the respective block areas on the high frequency side and the low frequency side, respectively.

In step S507, the CPU 31 performs noise rejection in which the focusing amount influenced by the noise is removed from the focusing amounts of the respective block areas on the high frequency side determined in step S506.

In step S508, in order to calculate a difference of the focusing amounts on the high frequency side and the low frequency side, the CPU 31 performs level adjustment of values between the focusing amounts. After the level adjustment is performed, the CPU 31 obtains the difference of the focusing amounts on the high frequency side and the low frequency side for each of the block areas. The CPU 31 holds the determined value in the memory 32 as a difference focusing amounts in each of the block areas.

Figure 17:
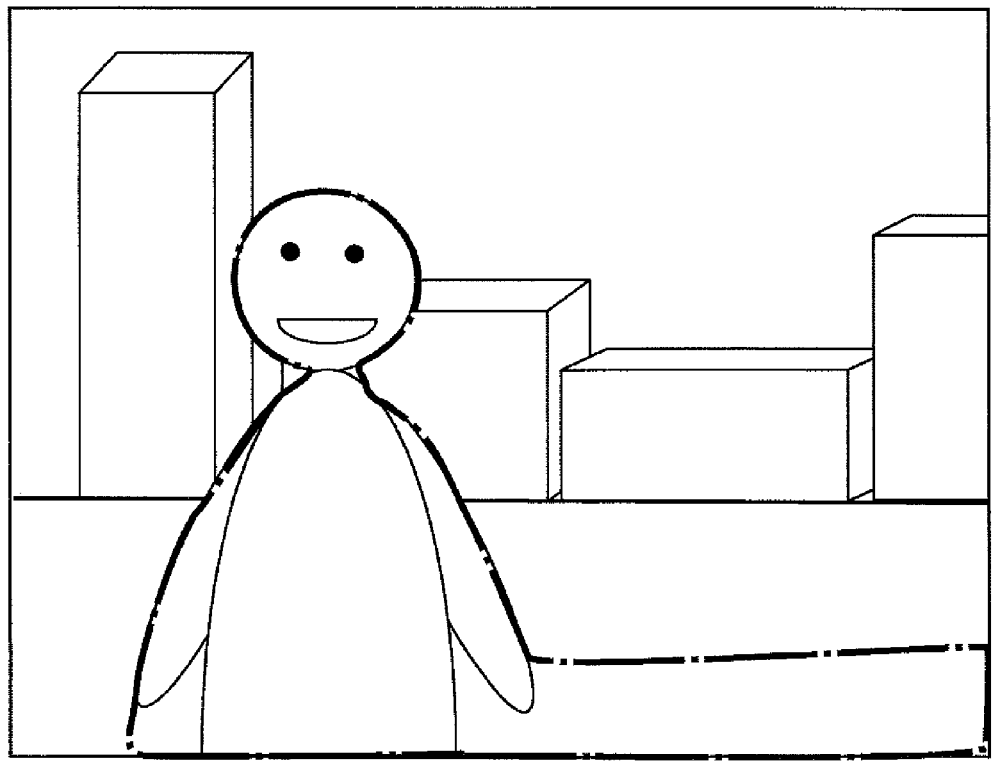
FIG. 17 is a view showing, by a line, an area having a difference focusing amounts having positive values in the captured image of FIG. 11.

In step S509, the CPU 31 outputs the image to the output device 38 through the input/output interface 36. At the same time, the CPU 31 graphically shows by a line and the like, on the image output to the output device 38, an area having positive values of the difference focusing amounts determined in step S508 as an area in which the in-focus is achieved, and terminates the focusing measurement. FIG. 17 is a view showing by a dotted line, when the image read in step S501 is the person and the buildings being the background in FIG. 11, an area having the positive values of the difference focusing amounts based on the distribution in FIG. 15.

<<Sixth Embodiment>>

Figure 18:
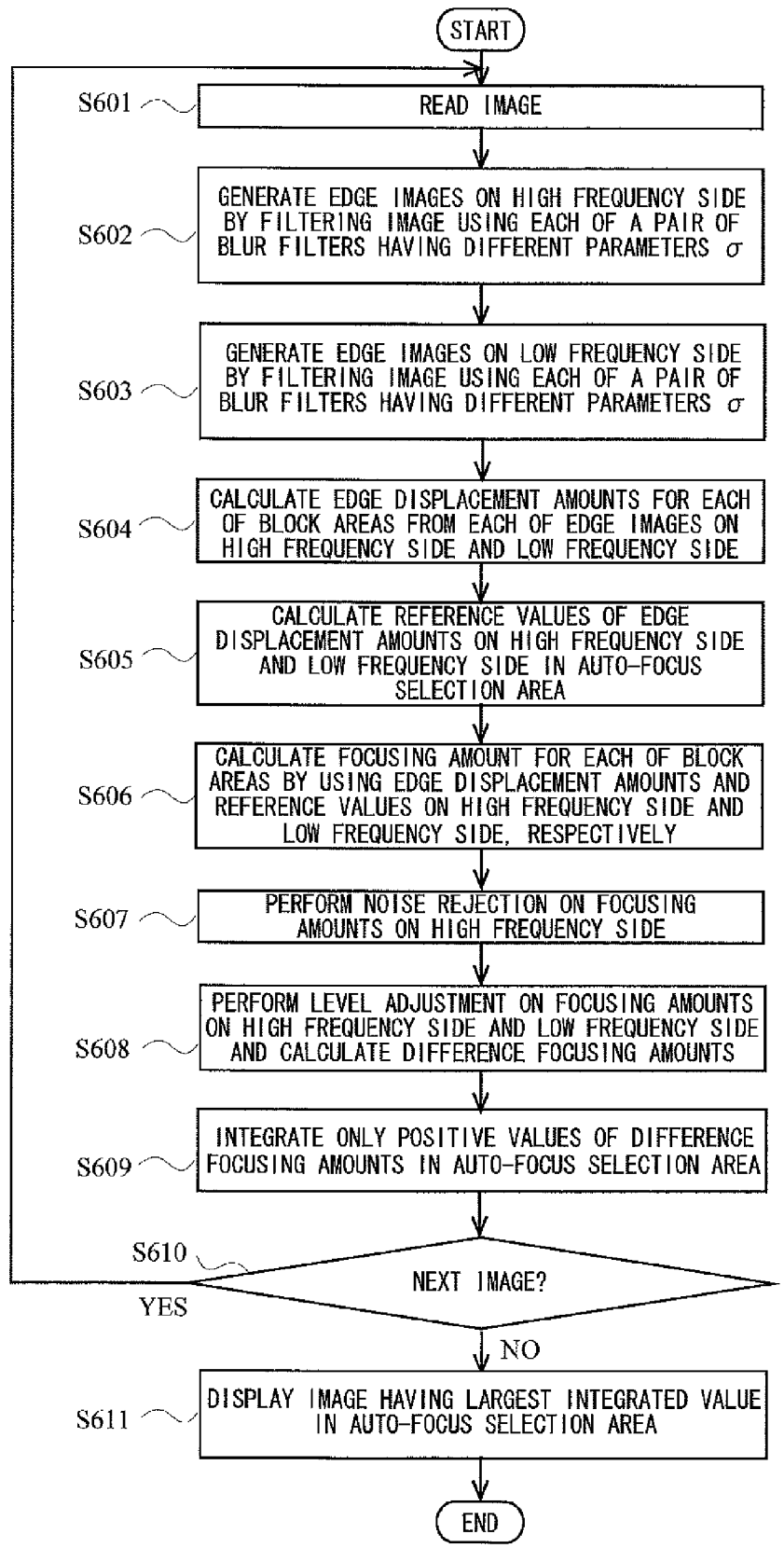
FIG. 18 is a flow chart showing a procedure of focusing measurement according to the present sixth embodiment.

FIG. 18 is a flow chart of processing in a focusing measurement device according to a sixth embodiment of the present invention.

The focusing measurement device according to the present sixth embodiment is basically the same as the focusing measurement device 30 according to the fifth embodiment, so that an explanation regarding operations of respective components will be omitted. The point that the present sixth embodiment differs from the fifth embodiment is to select an image with the highest focusing level based on a reference value of one image to be a reference among a plurality of images captured through continuous shooting and the like.

Concretely, a user uses the input device 37 to perform initial setting and the like and to make a start instruction by inputting a command of a focusing measurement program. Upon receiving the instruction through the input/output interface 36, the CPU 31 of the focusing measurement device 30 executes the focusing measurement program stored in the memory 32. As a result of this, processing of step S601 to step S611 in FIG. 18 is performed. Note that in the description herein below, it is assumed that a plurality of images of the subject in FIG. 11 captured through continuous shooting are previously stored in the storage device 33 of the focusing measurement device 30.

In step S601, the CPU 31 reads one image from the storage device 33 and holds it in the memory 32. Note that in the present sixth embodiment, the first piece of image is set as a reference image.

In step S602, the CPU 31 extracts two edge amounts from the image. The CPU 31 performs smoothing processing on the image by using each of two Gaussian type blur filters P each having a different parameter σ indicating a frequency characteristic on a high frequency side, to thereby generate blurred images. By obtaining a difference between the captured image and the respective blurred images, the CPU 31 generates two edge images on the high frequency side indicating a distribution of the edge amounts. The CPU 31 holds the two edge images on the high frequency side in the memory 32. Note that the parameters σ on the high frequency side are set as 0.7 and 0.8, as in the present fourth embodiment.

In step S603, the CPU 31 performs, through the same procedure as that of step S502, smoothing processing on the image by using each of two Gaussian type blur filters P each having a different parameter a indicating a frequency characteristic on a low frequency side, to thereby generate blurred images. By obtaining a difference between the captured image and the respective blurred images, the CPU 31 generates two edge images on the low frequency side indicating a distribution of the edge amounts. The CPU 31 holds the two edge images on the low frequency side in the memory 32. Note that the parameters σ on the low frequency side are set as 1.5 and 1.6, as in the fourth embodiment.

In step S604, the CPU 31 calculates an absolute value of difference of the two edge images on the high frequency side and the low frequency side, respectively, determined in step S602 and step S603. Subsequently, two-dimensional data of the calculated absolute value of difference is divided into block areas each having a size of 30 pixels×30 pixels, for instance, and an average value thereof is determined for each of the block areas. The CPU 31 holds the calculated average value in the memory 32 as an amount of edge displacement.

In step S605, the CPU 31 determines an average value of the amounts of edge displacement on the high frequency side and the low frequency side, respectively, in the auto-focus selection area 40 by using the amounts of edge displacement in the block areas included in the auto-focus selection area 40 among the amounts of edge displacement on the high frequency side and the low frequency side determined in step S604. The CPU 31 holds the determined average values in the memory 32 as reference values of the amounts of edge displacement on the high frequency side and the low frequency side, respectively.

In step S606, the CPU 31 subtracts the reference values determined in step S605 from the amounts of edge displacement of the respective block areas on the high frequency side and the low frequency side, respectively, determined in step S604. The CPU 31 holds the obtained values in the memory 32 as focusing amounts of the respective block areas on the high frequency side and the low frequency side, respectively.

In step S607, the CPU 31 performs noise rejection in which the focusing amount influenced by the noise is removed from the focusing amounts of the respective block areas on the high frequency side determined in step S606.

In step S608, in order to calculate a difference of the focusing amounts and the reference values on the high frequency side and the low frequency side, the CPU 31 performs level adjustment of values between the focusing amounts and between the reference values. Here, to compare each of the images captured through the continuous shooting, the level adjustment is performed on the other images by applying the value of parameter for the level adjustment used in the reference image also to the other images. Therefore, if the image being the processing target is the reference image, the CPU 31 holds the value of parameter used for the level adjustment in the memory 32. After the level adjustment is performed, the CPU 31 obtains the difference of the focusing amounts on the high frequency side and the low frequency side for each of the block areas, and holds the determined value in the memory 32 as a difference focusing amounts in each of the block areas.

In step S609, the CPU 31 determines an integrated value obtained by integrating only the positive values of the difference focusing amounts in each of the block areas in the auto-focus selection area 40. The CPU 31 holds the integrated value in the memory 32.

In step S610, the processing proceeds to step S611 (NO side) if the CPU 31 performs the processing on all of the images captured through the continuous shooting. If there still exists an unprocessed image, the processing proceeds to step S601 (YES side). The CPU 31 performs the processing from step S601 to step S609 on all of the images captured through the continuous shooting. The CPU 31 holds the integrated values of the respective images in the memory 32.

In step S611, the CPU 31 reads, from the memory 32, the integrated values of all of the images captured through the continuous shooting determined in step S609. The CPU 31 outputs the image having the largest integrated value as the most focused image to the output device 38 through the input/output interface 36, and terminates the focusing measurement.

<Supplementary Items to the Embodiments>

In the first embodiment to the sixth embodiment, it is set that the edge amount is the value determined from the difference between the image and the respective blurred images, but, the present invention is not limited to this. For example, it is also possible to set that the edge amount is the value determined from the absolute value of the difference between the image and the respective blurred images.

Note that in the first embodiment to the sixth embodiment, the size of each of the block areas is set as 30 pixels×30 pixels, but, the present invention is not limited to this. Preferably, the size of the block area is appropriately selected in accordance with a size of an image to be processed, a processing speed, a size of a memory area, an accuracy of focusing measurement, and the like.

Figure 9:
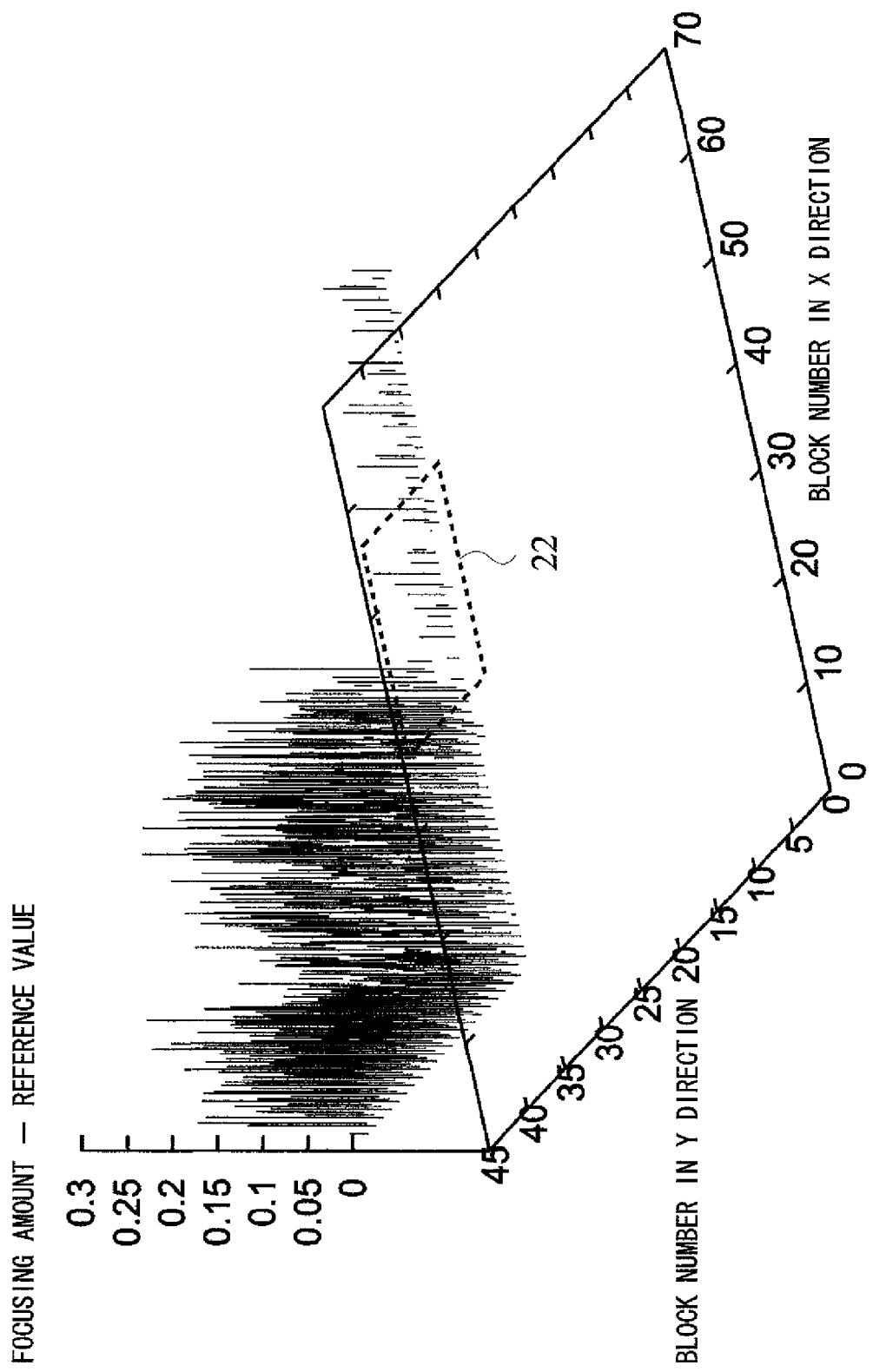
FIG. 9 is a view three-dimensionally showing a distribution of difference having positive values among a difference of newly defined focusing amounts with respect to the reference value in each block area of the captured image of FIG. 3.

Note that in the first embodiment to the third embodiment, the focusing amount is set as the value determined by dividing the difference of the average values of the two edge amounts in each of the block areas by the average value of the edge amounts in the same block area determined by using σ that equals to 0.5, but, the present invention is not limited to this. For instance, it is also possible to set the value determined by dividing the difference of the average values of the two edge amounts by the average value of the edge amounts in the same block area determined by using σ that equals to 0.6, or by the average value of the average value of the edge amounts determined by using σ that equals to 0.5 and the average value of the edge amounts determined by using σ that equals to 0.6, as the focusing amount, or it is also possible to set a simple difference between the average values of the two edge amounts as the focusing amount. FIG. 9 shows, when the difference of the average values of the two edge amounts is set as the focusing amount based on the image in FIG. 3 in step S105 in the present first embodiment, for instance, a distribution of focusing amounts having positive values when the reference value is subtracted therefrom, similarly as in FIG. 4. Note that in a plane of FIG. 9 in which the focusing amount equals to the reference value, an area corresponding to the auto-focus selection area 20 in FIG. 3 is denoted by 22.

Note that in the first embodiment to the third embodiment, the average value of the edge amounts determined from each of the edge images in each of the block areas is used to determine the focusing amount, but, the present invention is not limited to this. It is also possible to use a variance value of the edge amounts determined from each of the edge images in each of the block areas.

Note that in the first embodiment to the third embodiment, it is set that the reference value of the focusing amounts is the value determined from the image designated as the reference image among the read images or the plurality of images obtained through the continuous shooting, but, the present invention is not limited to this. For instance, a value directly input by the user can be used as the reference value.

Note that in the first embodiment to the third embodiment, the parameters σ of the blur filters P are set as 0.5 and 0.6, but, the present invention is not limited to this. As not only the accuracy of the focusing measurement and the like but also the ISO sensitivity of the imaging element becomes higher, more noise of spike shape from the pixels of the imaging element appears on the image, so that it is preferable to appropriately select the parameters σ of the blur filters P in accordance with the ISO sensitivity of the imaging element to reduce the influence of noise.

Note that in the first embodiment or the sixth embodiment, the auto-focus selection area 20 is set in an area in the vicinity of a center of field of view to be captured, but, the present invention is not limited to this. The auto-focus selection area 20 can also be set in an area which is out of the center of field of view. Alternatively, the auto-focus selection area 20 can be set as a plurality of areas, in which all of the areas can be used for the focusing measurement or a part of the areas can be appropriately selected to be used for the focusing measurement.

Note that in the first embodiment or the third embodiment, the reference value is determined by using the focusing amounts of the block areas included in the auto-focus selection area 20, but, the present invention is not limited to this. The reference value can be determined by using the focusing amounts of the block areas in the entire image.

Note that in the second embodiment, the reference value is determined by using the focusing amounts of all of the block areas, but, the present invention is not limited to this. For example, the reference value can be determined by using the focusing amounts of the block areas included in the auto-focus selection area or in an area of any size.

Note that in the present third embodiment or the present sixth embodiment, the first piece of image is set as the reference image, but, the present invention is not limited to this. The reference image can be arbitrarily determined from the plurality of images captured through the continuous shooting.

Note that in the fourth embodiment to the sixth embodiment, the amount of edge displacement is set as the value determined by averaging the absolute value of difference of the two edge images in each of the block areas, but, the present invention is not limited to this. For instance, it is possible to use a value obtained by integrating the absolute value of difference of the two edge images in each of the block areas, an average value or an integrated value of the difference of the two edge images in each of the block areas, as the amount of edge displacement.

Note that in the fourth embodiment to the sixth embodiment, the focusing amount is set as the value determined from the difference between the average value of the amounts of edge displacement in each of the block areas and the reference value, but, the present invention is not limited to this. For example, the focusing amount can also be determined from a difference between a value obtained by dividing the average value of the amounts of edge displacement in the block area by an average value of edge amounts of either of the edge images in the same block area or by a value obtained by further averaging the average values of the edge amounts and the reference value.

Note that in the fourth embodiment to the sixth embodiment, the average value of the amounts of edge displacement in each of the block areas is used to determine the focusing amount, but, the present invention is not limited to this. It is also possible to use a variance value of the amount of edge displacement in each of the block areas.

Note that in the fourth embodiment to the present sixth embodiment, the reference value of the amounts of edge displacement is determined by using the amounts of edge displacement in the read image or the plurality of images captured through the continuous shooting, but, the present invention is not limited to this. For instance, a value directly input by the user can be used as the reference value.

Note that in the fourth embodiment to the sixth embodiment, the parameters σ of the blur filters P on the high frequency side are set as 0.7 and 0.8, and the parameters σ on the low frequency side are set as 1.5 and 1.6, but, the present invention is not limited to this. It is preferable to appropriately select the parameters σ of the blur filters P on the high frequency side and the low frequency side in accordance with not only the accuracy of the focusing measurement and the like but also the ISO sensitivity of the imaging element.

Note that in the fourth embodiment to the sixth embodiment, a publicly known method can be appropriately selected and used as the method for performing the noise rejection.

Note that in the fourth embodiment to the sixth embodiment, a publicly known method can be appropriately selected and used as the method for performing the level adjustment.

Note that in the fourth embodiment or the present sixth embodiment, the reference value of the amounts of edge displacement is determined by using the amounts of edge displacement in the auto-focus selection area 40, but, the present invention is not limited to this. It is also possible to determine the reference value by using the amounts of edge displacement in the entire image.

Note that in the present fifth embodiment, the reference value of the amounts of edge displacement is determined by using the amounts of edge displacement in the entire image, but, the present invention is not limited to this. For example, it is possible to determine the reference value by using the amounts of edge displacement in the auto-focus selection area or in an area of any size.

Note that the present invention can also be applied to make a computer function as a focusing measurement device having a program to realize respective steps in a focusing measurement method according to the present invention to measure a focusing level of an image.

Note that the present invention can also be applied to a recording medium that stores a computer program to realize respective steps in a focusing measurement method according to the present invention.

Note that the present invention can be embodied in other various forms without departing from the spirit or essential characteristics thereof. The above embodiments are therefore to be considered in all respects as illustrative and not restrictive. Moreover, all modifications and changes that fall within the equivalent scope of the appended claims are deemed to be within the scope of the present invention.

The many features and advantages of the embodiments are apparent from the detailed specification and, thus, it is intended by the appended claims to cover all such features and advantages of the embodiments that fall within the true spirit and scope thereof, Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A focusing measurement device, comprising:
   an image input section obtaining a captured image;
   a first filter section generating a first blurred image by using a first blur filter for the captured image and generating a second blurred image by using a second blur filter for the captured image, the second blur filter having different frequency characteristics from the first blur filter;
   a second filter section generating a third blurred image by using a third blur filter for the captured image, the third blur filter having the frequency characteristics being a low frequency side relative to the frequency characteristics of the first blur filter, and generating a fourth blurred image by using a fourth blur filter for the captured image, the fourth blur filter having frequency characteristics being a low frequency side relative to the frequency characteristics of the first blur filter and having different frequency characteristics from the third blur filter;
   a first focusing calculating section calculating a first focusing amount indicating a degree of in-focus by using first amounts of displacement between a first difference and a second difference along with obtaining the first difference between the first blurred image and the captured image, and obtaining the second difference between the second blurred image and the captured image;
   a second focusing calculating section calculating a second focusing amount indicating a degree of in-focus being a low frequency side relative to the first amounts of displacement by using second amounts of displacement between a third difference and a fourth difference along with obtaining the third difference between the third blurred image and the captured image, and obtaining the fourth difference between the fourth blurred image and the captured image; and
   a measurement section measuring a focusing level of the captured image by using a difference between the first focusing amount and the second focusing amount.

2. The focusing measurement device according to claim 1, wherein:
   the first focusing amount is one of a first difference of the pair of feature quantities each extracted from the image and each of images of the first blurred image group, a value obtained by dividing the first difference by one of the feature quantities of the image, and a value obtained by dividing the first difference by an average value of the feature quantities of the image; and
   the second focusing amount is one of a second difference of the pair of feature quantities each extracted from the image and each of images of the second blurred image group, a value obtained by dividing the second difference by one of the feature quantities of the image, and a value obtained by dividing the second difference by an average value of the feature quantities of the image.

3. The focusing measurement device according to claim 1, wherein
   each of the feature quantities of the image each extracted from the image and one of the first blurred image group and the second blurred image group is one of an average value of edge amounts of the image, an average value of absolute values of the edge amounts, and a variance value of the edge amounts.

4. The focusing measurement device according to claim 1, wherein:
   the first filter section further comprises a first frequency characteristic adjustment part changing each of the frequency characteristics in accordance with an ISO sensitivity of an imaging element; and
   the second filter section further comprises a second frequency characteristic adjustment part changing each of the frequency characteristics on the low frequency side in accordance with the ISO sensitivity of the imaging element.

5. The focusing measurement device according to claim 1, wherein
the first filter section further comprises a noise rejection part performing rejection of noise component on the first focusing amount.

6. The focusing measurement device according to claim 1, further comprising
a reference value calculating section calculating a first reference value by using the first focusing amount in an auto-focus selection area when capturing and calculating a second reference value by using the second focusing amount in the auto-focus selection area, wherein
the measurement section further comprises a reference value measurement part measuring the focusing level of the captured image based on a magnitude of value of the first focusing amount with respect to the first reference value and a magnitude of value of the second focusing amount with respect to the second reference value.

7. The focusing measurement device according to claim 6, wherein
the measurement section further comprises a reference value storage part holding the first reference value and the second reference value to use the first reference value and the second reference value also in a measurement of focusing level of other images captured by a same imaging device.

8. The focusing measurement device according to claim 6, wherein
the predetermined area is an entire area of the image.

9. The focusing measurement device according to claim 1, wherein
the measurement section further comprises a level adjustment part performing level adjustment on both the first focusing amount and the second focusing amount, and measures the focusing level at each of the plurality of points on the image based on a difference between the first focusing amount and the second focusing amount.

10. A non-transitory computer readable storage medium storing a program causing a computer to function as the focusing measurement device according to claim 1.

11. The focusing measurement device according to claim 1, wherein
the measurement section sets one of a difference between a first feature quantity and a second feature quantity, a value obtained by dividing the difference by the first feature quantity, a value obtained by dividing the difference by the second feature quantity, and a value obtained by dividing the difference by an average value of the first feature quantity and the second feature quantity as the focusing amount.

12. The focusing measurement device according to claim 1, wherein
a first feature quantity and a second feature quantity are edge amounts each determined from one of a difference between the image and the respective blurred images, and an absolute value of the difference.

13. The focusing measurement device according to claim 1, wherein
the measurement section further comprises:
a reference value calculating part calculating a reference value of the focusing level based on the focusing amount calculated at each of specific points within a predetermined area among all of the specific points of the image; and
a reference value measurement part measuring the focusing level at each of the specific points on the image based on a magnitude of value of the focusing amount with respect to the reference value.

14. The focusing measurement device according to claim 13, wherein
the measurement section further comprises a reference value storage part holding the reference value to use the reference value also in a measurement of focusing level of other images captured by a same imaging device.

15. The focusing measurement device according to claim 1, wherein
a filter section further comprises a frequency characteristic adjustment part changing the frequency characteristics of the filters in accordance with an ISO sensitivity of an imaging element.

16. The focusing measurement device according to claim 13, wherein the predetermined area is an entire area of the image.

17. The focusing measurement device according to claim 13, wherein the predetermined area is an auto-focus selection area at a time of photographing.

* * * * *